United States Patent
Pezeshki et al.

(10) Patent No.: US 12,363,571 B2
(45) Date of Patent: Jul. 15, 2025

(54) REFERENCE SIGNAL PERIODICITIES FOR MULTIPLE SETS OF BEAMS

(71) Applicant: QUALCOMM Incorporated, San Diego, CA (US)

(72) Inventors: Hamed Pezeshki, San Diego, CA (US); Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 762 days.

(21) Appl. No.: 17/590,653

(22) Filed: Feb. 1, 2022

(65) Prior Publication Data
US 2023/0247458 A1 Aug. 3, 2023

(51) Int. Cl.
*H04W 24/10* (2009.01)
*H04B 7/08* (2006.01)
*H04L 5/00* (2006.01)
*H04W 24/08* (2009.01)

(52) U.S. Cl.
CPC ............ *H04W 24/10* (2013.01); *H04B 7/088* (2013.01); *H04L 5/0051* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 12,003,988 B2 * | 6/2024 | Cirik | H04B 7/088 |
| 2020/0220772 A1 * | 7/2020 | Xia | H04W 16/28 |
| 2021/0160947 A1 * | 5/2021 | Hu | H04W 80/02 |
| 2021/0307078 A1 * | 9/2021 | Singh | H04L 5/0048 |
| 2022/0200687 A1 * | 6/2022 | Guo | H04L 5/0048 |
| 2022/0303795 A1 * | 9/2022 | Bala | H04W 24/08 |
| 2023/0051047 A1 * | 2/2023 | Xu | H04W 24/04 |
| 2023/0088597 A1 * | 3/2023 | Alfarhan | H04W 76/28 370/252 |
| 2023/0101089 A1 * | 3/2023 | Cui | H04W 52/146 455/522 |
| 2023/0144010 A1 * | 5/2023 | Kwak | H04B 7/0695 370/329 |
| 2023/0208579 A1 * | 6/2023 | Jung | H04B 7/0617 |
| 2023/0344593 A1 * | 10/2023 | Tsai | H04L 5/0051 |
| 2023/0413086 A1 * | 12/2023 | Bagheri | H04L 5/006 |
| 2024/0064839 A1 * | 2/2024 | Xu | H04B 7/0663 |

* cited by examiner

*Primary Examiner* — Phirin Sam
(74) *Attorney, Agent, or Firm* — Holland & Hart LLP

(57) ABSTRACT

Methods, systems, and devices for wireless communications are described. A user equipment (UE) may receive control signaling from a network node indicating a reference signal (RS) configuration for RS measurements. The RS configuration may indicate a first set of beams, a first periodicity for measuring RSs on the first set of beams, a second set of beams, and a second periodicity for measuring RSs on the second set of beams. The UE may monitor a wireless channel for a first set of RSs communicated via the first set of beams according to the first periodicity and monitor the wireless channel for a second set of RSs communicated via the second set of beams according to the second periodicity. The UE and the network node may dynamically update one or more of the beam sets, periodicities, or both, to perform RS measurements.

30 Claims, 18 Drawing Sheets

REFERENCE SIGNAL PERIODICITIES FOR MULTIPLE SETS OF BEAMS

FIELD OF TECHNOLOGY

The following relates to wireless communication, including reference signal periodicities for multiple sets of beams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Reference signals (RS) may be transmitted to a UE using time, frequency, or spatial resources, or any combination thereof. A UE may measure one or more RSs over the corresponding resources and may report the measurements to a base station.

SUMMARY

The described techniques relate to improved methods, systems, devices, and apparatuses that support reference signal (RS) periodicities for multiple sets of beams. A user equipment (UE) may receive control signaling from a base station (e.g., network node) indicating a configuration for RS measurements. The RS configuration may indicate a first set of beams, a first periodicity for measuring RSs on the first set of beams, a second set of beams, and a second periodicity for measuring RSs on the second set of beams. The UE may monitor a wireless channel for a first set of RSs communicated via the first set of beams according to the first periodicity and monitor the wireless channel for a second set of RSs communicated via the second set of beams according to the second periodicity. The UE and the base station (e.g., network node) may dynamically update one or more of the beam sets, periodicities, or both, to perform RS measurements. For example, based on a machine learning algorithm, the UE, the base station, or both, may determine to change a measurement frequency of one or more RSs and associated beam(s) (e.g., for beam management). Based on the determination, the UE and the base station may dynamically update one or more of the beam sets, periodicities, or both, to perform RS measurements. Thus, based on a machine learning algorithm, the base station, the UE, or both, may fine-tune (e.g., optimize) a measurement frequency of one or more RSs and the associated beam(s).

A method for wireless communication at a UE is described. The method may include receiving, from a network node, an indication of a configuration for RS measurements, selecting, based on the configuration, a first set of beams, a first periodicity for measuring RSs on the first set of beams, a second set of beams, and a second periodicity for measuring RSs on the second set of beams, where the second periodicity is different than the first periodicity, monitoring a wireless channel for a first set of RSs communicated via the first set of beams according to the first periodicity, and monitoring the wireless channel for a second set of RSs communicated via the second set of beams according to the second periodicity.

An apparatus for wireless communication at a UE is described. The apparatus may include a processor, memory coupled with the processor, and instructions stored in the memory. The instructions may be executable by the processor to cause the apparatus to receive, from a network node, an indication of a configuration for RS measurements, select, based on the configuration, a first set of beams, a first periodicity for measuring RSs on the first set of beams, a second set of beams, and a second periodicity for measuring RSs on the second set of beams, where the second periodicity is different than the first periodicity, monitor a wireless channel for a first set of RSs communicated via the first set of beams according to the first periodicity, and monitor the wireless channel for a second set of RSs communicated via the second set of beams according to the second periodicity.

Another apparatus for wireless communication at a UE is described. The apparatus may include means for receiving, from a network node, an indication of a configuration for RS measurements, means for selecting, based on the configuration, a first set of beams, a first periodicity for measuring RSs on the first set of beams, a second set of beams, and a second periodicity for measuring RSs on the second set of beams, where the second periodicity is different than the first periodicity, means for monitoring a wireless channel for a first set of RSs communicated via the first set of beams according to the first periodicity, and means for monitoring the wireless channel for a second set of RSs communicated via the second set of beams according to the second periodicity.

A non-transitory computer-readable medium storing code for wireless communication at a UE is described. The code may include instructions executable by a processor to receive, from a network node, an indication of a configuration for RS measurements, select, based on the configuration, a first set of beams, a first periodicity for measuring RSs on the first set of beams, a second set of beams, and a second periodicity for measuring RSs on the second set of beams, where the second periodicity is different than the first periodicity, monitor a wireless channel for a first set of RSs communicated via the first set of beams according to the first periodicity, and monitor the wireless channel for a second set of RSs communicated via the second set of beams according to the second periodicity.

Some examples of the method, apparatuses, and non-transitory computer-readable medium described herein may further include operations, features, means, or instructions for receiving a control message indicating an update to the configuration for RS measurements and monitoring the wireless channel for the first set of RSs and the second set of RSs according to the updated configuration for RS measurements.

Some examples of the method, apparatuses, and non-transitory computer-readable medium described herein may further include operations, features, means, or instructions for transmitting a measurement report to the network node based on monitoring for the first set of RSs and monitoring for the second set of RSs, where receiving the control message indicating the update may be based on transmitting the measurement report.

In some examples of the method, apparatuses, and non-transitory computer-readable medium described herein, the measurement report indicates a subset of beams having a highest communication quality across the first set of beams and the second set of beams, the subset of beams including a defined quantity of beams.

Some examples of the method, apparatuses, and non-transitory computer-readable medium described herein may further include operations, features, means, or instructions for receiving the control message indicating to move one or more beams from the first set of beams to the second set of beams, move one or more beams from the second set of beams to the first set of beams, or any combination thereof, monitoring the wireless channel for the first set of RSs communicated via the first set of beams according to the updated configuration for RS measurements, and monitoring the wireless channel for the second set of RSs communicated via the second set of beams according to the updated configuration for RS measurements.

Some examples of the method, apparatuses, and non-transitory computer-readable medium described herein may further include operations, features, means, or instructions for receiving the control message indicating an updated value for the first periodicity, an updated value for the second periodicity, or both, monitoring the wireless channel for the first set of RSs according to the first periodicity based on the updated configuration for RS measurements, and monitoring the wireless channel for the second set of RSs according to the second periodicity based on the updated configuration for RS measurements.

Some examples of the method, apparatuses, and non-transitory computer-readable medium described herein may further include operations, features, means, or instructions for receiving the control message indicating to remove one or more beams from the first set of beams, remove one or more beams from the second set of beams, or both, monitoring the wireless channel for the first set of RSs communicated via the first set of beams according to the updated configuration for RS measurements, and monitoring the wireless channel for the second set of RSs communicated via the second set of beams according to the updated configuration for RS measurements.

Some examples of the method, apparatuses, and non-transitory computer-readable medium described herein may further include operations, features, means, or instructions for receiving the control message indicating to add one or more beams to the first set of beams, add one or more beams to the second set of beams, or both, monitoring the wireless channel for the first set of RSs communicated via the first set of beams according to the updated configuration for RS measurements, and monitoring the wireless channel for the second set of RSs communicated via the second set of beams according to the updated configuration for RS measurements.

In some examples of the method, apparatuses, and non-transitory computer-readable medium described herein, the configuration for RS measurements configures the UE to monitor for the first set of RSs and the second set of RSs within a same time window.

Some examples of the method, apparatuses, and non-transitory computer-readable medium described herein may further include operations, features, means, or instructions for monitoring for the first set of RSs at least partially overlaps with monitoring for the second set of RSs.

In some examples of the method, apparatuses, and non-transitory computer-readable medium described herein, the first periodicity and the second periodicity each include a respective periodicity stored at the UE.

In some examples of the method, apparatuses, and non-transitory computer-readable medium described herein, the configuration for RS measurements may be indicative of one or more parameters for selecting a third set of beams and a third periodicity for measuring RSs on the third set of beams and the third periodicity may be different from the first periodicity and the second periodicity.

A method for wireless communication at a network node is described. The method may include transmitting, to a UE, an indication of a configuration for RS measurements, the configuration indicative of one or more parameters for selecting a first set of beams, a first periodicity for measuring RSs on the first set of beams, a second set of beams, and a second periodicity for measuring RSs on the second set of beams, where the second periodicity is different than the first periodicity, transmitting a first set of RSs over a wireless channel via the first set of beams and according to the first periodicity, and transmitting a second set of RSs over the wireless channel via the second set of beams and according to the second periodicity.

An apparatus for wireless communication at a network node is described. The apparatus may include a processor, memory coupled with the processor, and instructions stored in the memory. The instructions may be executable by the processor to cause the apparatus to transmit, to a UE, an indication of a configuration for RS measurements, the configuration indicative of one or more parameters for selecting a first set of beams, a first periodicity for measuring RSs on the first set of beams, a second set of beams, and a second periodicity for measuring RSs on the second set of beams, where the second periodicity is different than the first periodicity, transmit a first set of RSs over a wireless channel via the first set of beams and according to the first periodicity, and transmit a second set of RSs over the wireless channel via the second set of beams and according to the second periodicity.

Another apparatus for wireless communication at a network node is described. The apparatus may include means for transmitting, to a UE, an indication of a configuration for RS measurements, the configuration indicative of one or more parameters for selecting a first set of beams, a first periodicity for measuring RSs on the first set of beams, a second set of beams, and a second periodicity for measuring RSs on the second set of beams, where the second periodicity is different than the first periodicity, means for transmitting a first set of RSs over a wireless channel via the first set of beams and according to the first periodicity, and means for transmitting a second set of RSs over the wireless channel via the second set of beams and according to the second periodicity.

A non-transitory computer-readable medium storing code for wireless communication at a network node is described. The code may include instructions executable by a processor to transmit, to a UE, an indication of a configuration for RS measurements, the configuration indicative of one or more parameters for selecting a first set of beams, a first periodicity for measuring RSs on the first set of beams, a second set of beams, and a second periodicity for measuring RSs on the second set of beams, where the second periodicity is different than the first periodicity, transmit a first set of RSs over a wireless channel via the first set of beams and according to the first periodicity, and transmit a second set of RSs over the wireless channel via the second set of beams and according to the second periodicity.

Some examples of the method, apparatuses, and non-transitory computer-readable medium described herein may further include operations, features, means, or instructions for transmitting a control message indicating an update to the configuration for RS measurements and transmitting the first set of RSs and the second set of RSs over the wireless channel according to the updated configuration for RS measurements.

Some examples of the method, apparatuses, and non-transitory computer-readable medium described herein may further include operations, features, means, or instructions for receiving a measurement report from the UE based on transmitting the first set of RSs and the second set of RSs, where transmitting the control message indicating the update may be based on receiving the measurement report.

In some examples of the method, apparatuses, and non-transitory computer-readable medium described herein, the measurement report indicates a subset of beams having a highest communication quality across the first set of beams and the second set of beams, the subset of beams including a defined quantity of beams.

Some examples of the method, apparatuses, and non-transitory computer-readable medium described herein may further include operations, features, means, or instructions for identifying a change to make to the first set of beams, the second set of beams, or both using a machine learning algorithm, where transmitting the control message indicating the update to the configuration for RS measurements may be based on identifying the change.

Some examples of the method, apparatuses, and non-transitory computer-readable medium described herein may further include operations, features, means, or instructions for transmitting the control message indicating to move one or more beams from the first set of beams to the second set of beams, move one or more beams from the second set of beams to the first set of beams, or any combination thereof, transmitting the first set of RSs over the wireless channel via the first set of beams and according to the updated configuration for RS measurements, and transmitting the second set of RSs over the wireless channel via the second set of beams and according to the updated configuration for RS measurements.

Some examples of the method, apparatuses, and non-transitory computer-readable medium described herein may further include operations, features, means, or instructions for transmitting the control message indicating an updated value for the first periodicity, an updated value for the second periodicity, or both, transmitting the first set of RSs over the wireless channel according to the first periodicity based on the updated configuration for RS measurements, and transmitting the second set of RSs over the wireless channel according to the second periodicity based on the updated configuration for RS measurements.

Some examples of the method, apparatuses, and non-transitory computer-readable medium described herein may further include operations, features, means, or instructions for transmitting the control message indicating to remove one or more beams from the first set of beams, remove one or more beams from the second set of beams, or both, transmitting the first set of RSs over the wireless channel via the first set of beams and according to the updated configuration for RS measurements, and transmitting the second set of RSs over the wireless channel via the second set of beams and according to the updated configuration for RS measurements.

Some examples of the method, apparatuses, and non-transitory computer-readable medium described herein may further include operations, features, means, or instructions for transmitting the control message indicating to add one or more beams to the first set of beams, add one or more beams to the second set of beams, or both, transmitting the first set of RSs over the wireless channel via the first set of beams and according to the updated configuration for RS measurements, and transmitting the second set of RSs over the wireless channel via the second set of beams and according to the updated configuration for RS measurements.

In some examples of the method, apparatuses, and non-transitory computer-readable medium described herein, the configuration for RS measurements configures the UE to monitor for the first set of RSs and the second set of RSs within a same time window.

Some examples of the method, apparatuses, and non-transitory computer-readable medium described herein may further include operations, features, means, or instructions for transmitting the first set of RSs at least partially overlaps with transmitting the second set of RSs.

In some examples of the method, apparatuses, and non-transitory computer-readable medium described herein, the first periodicity and the second periodicity each include a respective periodicity stored at the network node.

In some examples of the method, apparatuses, and non-transitory computer-readable medium described herein, the configuration for RS measurements may be indicative of one or more additional parameters for selecting a third set of beams and a third periodicity for measuring RSs on the third set of beams and the third periodicity may be different from the first periodicity and the second periodicity.

DETAILED DESCRIPTION

Figure 1:
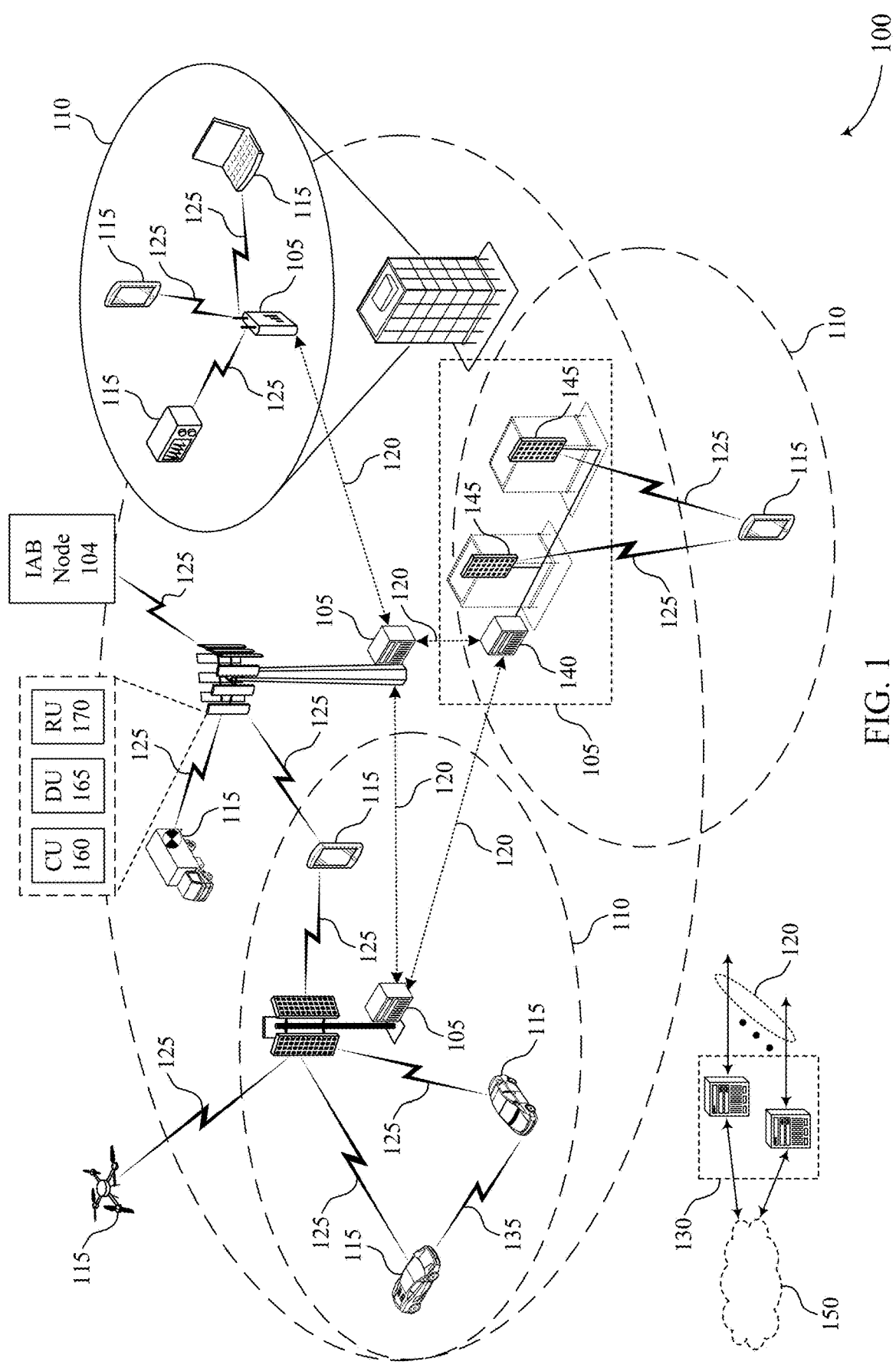
FIG. 1 illustrates an example of a wireless communications system that supports reference signal (RS) periodicities for multiple sets of beams in accordance with aspects of the present disclosure.

A wireless communications system may include various communication devices such as a user equipment (UE) and a base station, where the base station may provide wireless communication services to the UE. For example, the base station may be a next-generation NodeB (referred to as a gNB) that may support multiple radio access technologies including fourth generation (4G) systems, such as 4G Long Term Evolution (LTE), as well as fifth generation (5G) systems, which may be referred to as 5G New Radio (NR).

The UE may receive one or more reference signals (RSs) (e.g., RS sets) from the base station. The RSs may be transmitted using time, frequency, or spatial resources, or any combination thereof. The UE may monitor for and measure one or more RS sets and may report the measurements to the base station. In some cases (e.g., based on a dependence or relation between RS measurements), measurement results may be obtained using a lower density or amount (e.g., a higher periodicity) of RS measurements. However, in some cases, the UE and the base station may not support dynamic reduction of the density of some RS measurements, which may result in higher resource overhead. For example, while a density of RS measurements in time and frequency may be reduced, the UE and the base station may not support techniques for reducing measurement density in a spatial dimension, which may result in a higher resource use (e.g., higher overhead) for the spatial dimension. In such examples, the inability to adjust the measurement density may result in inefficient utilization of communication resources (e.g., increased overhead, such as resources that are not used), increased latency, and reduced communication quality.

Various aspects of the present disclosure relate to techniques for adjusting RS periodicities for multiple sets of beams. The described techniques may provide for the configuration of RS sets (e.g., channel state information (CSI) RSs (CSI-RSs)), beam sets, and measurement resources to support reporting RS measurements with increased accuracy or speed, among other benefits. The techniques describe performing RS measurements in a context of multiple beam sets. For example, a UE may receive control signaling from a base station indicating an RS configuration.

The RS configuration may indicate one or more RS sets, one or more beam sets associated with the one or more RS sets, and one or more respective periodicities associated with the one or more RS sets. The UE may measure the RS sets on the corresponding beam sets according to the indicated periodicities. By measuring RSs at different periodicities (e.g., a periodicity corresponding to a beam set associated with an RS set), such as by measuring some sets of beams at higher periodicities and some sets at lower periodicities, the UE and the base station may reduce overhead of spatial resource use, for example, in comparison to measuring RSs according to a single periodicity across all beams. The base station may update the beams within the different beam sets using one control message to update one or multiple beam sets, which may support increased flexibility and adaptation for measuring RSs on different beams, and according to different periodicities.

As an illustrative example, a first RS set configured by the base station may be associated with a first beam set and a first periodicity (e.g., a high-frequency beam set), and a second RS set may be associated with a second beam set and a second periodicity (e.g., a low-frequency beam set). Based on the RS configuration indicated by the base station, the UE may select (e.g., identify or determine) beams and periodicities for the indicated RS sets, and may monitor a wireless channel for the RS sets according to the identified beam sets and periodicities.

In some cases, the UE may transmit a measurement report to the base station based on monitoring (e.g., and measuring) the RS sets, and the base station may identify a change to make to the one or more beam sets, or to the one or more periodicities, based on the measurement report. For example, based on the measurement report, the base station may indicate (e.g., via one control message) a change in beams between the high-frequency and low-frequency measurement beam sets (e.g., beams may be added or removed from one or more beam sets, or beams may be switched between beam sets). In some cases, the base station may indicate the change(s) of beam(s) (e.g., may indicate a delta value, a change) rather than indicating a change to the configuration of the RS set(s) (e.g., by indicating a new configuration).

Aspects of the techniques described herein may be implemented to realize one or more of the following potential advantages or improvements, among others. The techniques described herein may provide benefits and enhancements to the operation of a UE, a base station, or both. For example, operations performed by the UE, the base station, or both, may provide improvements to RS measurement reporting by enabling the UE and the base station to adjust one or more beam sets, periodicities, or other parameters based on communication quality of the beams, which may result in improved communications, among other advantages.

Aspects of the disclosure are initially described in the context of wireless communications systems. Aspects of the disclosure are further illustrated by and described with reference to measurement resource configuration, beam set configurations, a process flow, apparatus diagrams, system diagrams, and flowcharts that relate to RS periodicities for multiple sets of beams.

FIG. 1 illustrates an example of a wireless communications system 100 that supports RS periodicities for multiple sets of beams in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Techniques described herein, in addition to or as an alternative to be carried out between UEs 115 and base stations 105, may be implemented via additional or alternative wireless devices, including IAB nodes 104, distributed units (DUs) 165, central units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 170 is flexible and as such gives rise to numerous permutations of different functionalities depending upon which functions (e.g., MAC functions, baseband functions, radio frequency functions, and any combinations thereof) are performed at the CU 160, DU 165, and RU 170. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques described herein. For example, some operations described as being performed by a UE 115 or a base station 105 may additionally or alternatively be performed by components of the disaggregated RAN architecture (e.g., IAB nodes, DUs, CUs, etc.).

A UE 115 and a base station 105 may communicate over a wireless channel. In some cases, the base station 105 may transmit an RS configuration to the UE 115, and the UE 115 may monitor (e.g., measure) wireless communication resources (e.g., time and frequency resources, spatial resources) based on the RS configuration. For example, the RS configuration may indicate a first RS set associated with a first beam set and a first periodicity (e.g., a high-frequency beam set) and a second RS set associated with a second beam set and a second periodicity (e.g., a low-frequency beam set). The UE 115 may select (e.g., identify, determine) beams and periodicities for the indicated RS sets and monitor the wireless channel for the RS sets according to the beam sets and periodicities. For example, the base station 105 may transmit an RS set over the indicated beam set during measurement opportunities (e.g., time windows or time periods) associated with the indicated periodicity, and the UE 115 may measure the RS set over the beam set during the measurement opportunities associated with the indicated periodicity.

In some cases, the base station 105 may transmit a control message to update the RS configuration, such as to indicate a change to one or more beam sets or to one or more periodicities. The UE 115 may update the selection of beams and periodicities and may monitor the wireless channel for the RS sets according to the update(s) indicated by the control message.

Figure 2:
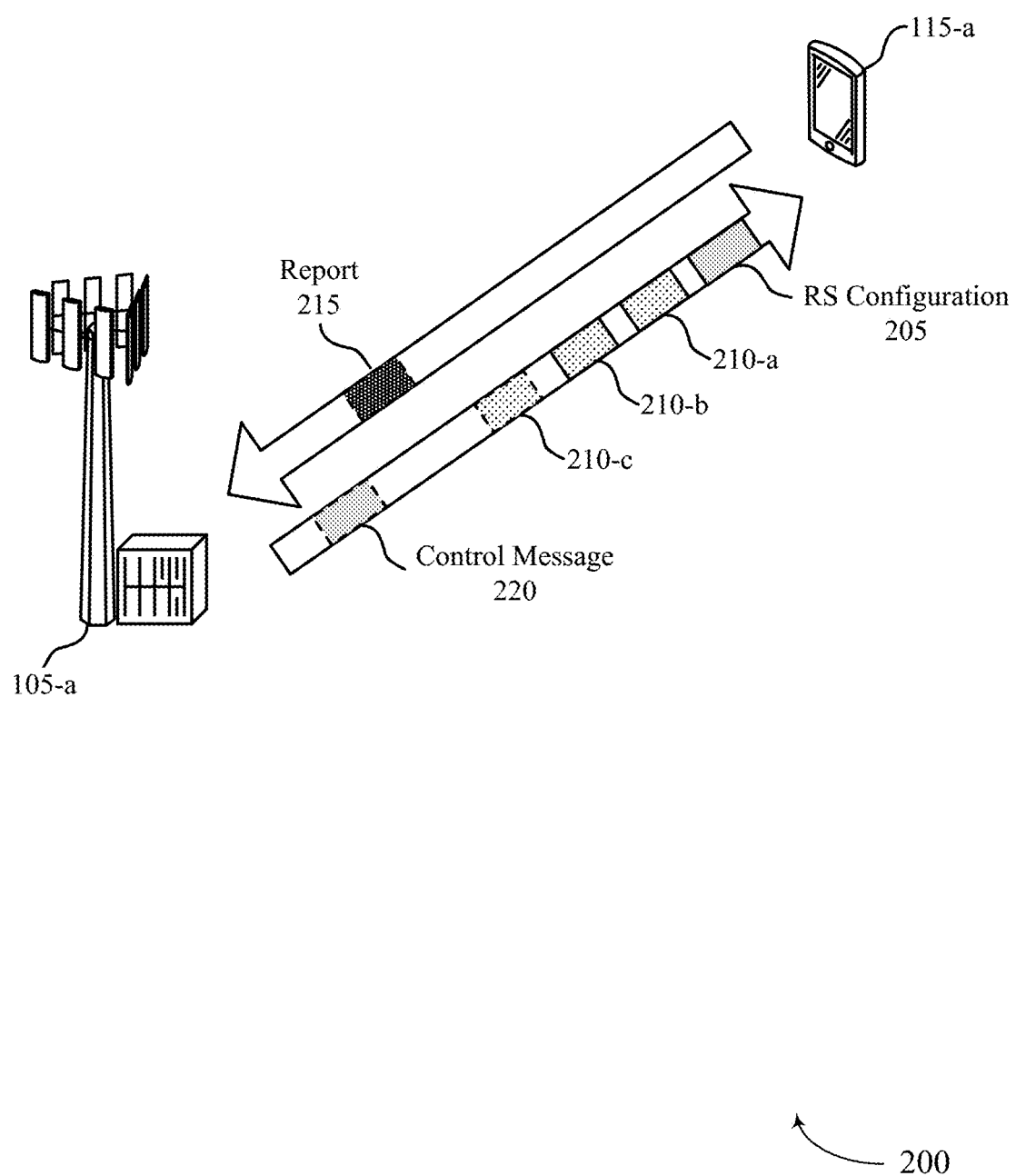
FIG. 2 illustrates an example of a wireless communications system that supports RS periodicities for multiple sets of beams in accordance with aspects of the present disclosure.

FIG. 2 illustrates an example of a wireless communications system 200 that supports RS periodicities for multiple sets of beams in accordance with the present disclosure. In some examples, the wireless communications system 200 may implement aspects of the wireless communications system 100 or may be implemented by aspects of the wireless communications system 100. For example, the wireless communications system 200 may include a UE 115-a and a base station 105-a which may be examples of corresponding devices described herein.

The UE 115-a may communicate with the base station 105-a. For example, the base station 105-a may transmit an RS configuration 205 to the UE 115-a. The RS configuration 205 may indicate a configuration for one or more RS measurements. For example, the RS configuration 205 may configure a first RS set 210-a and a second RS set 210-b, where each of the RS sets 210 may include one or more RSs.

In some cases, the RS configuration 205 may additionally configure a third RS set 210-c, or any number of other additional RS sets 210. In some examples, the first, second, and third RS sets 210 may be sets of CSI-RSs.

The RS sets may correspond to RS sets indicated by information stored at the UE 115-a, or to RS sets explicitly indicated by the base station 105-a. For example, the wireless communications system 200 may support explicit configuration of the RS configuration 205 (e.g., the base station 105-a may transmit one or more control information messages or signaling with fields that explicitly configure the first RS set 210-a, the second RS set 210-b, the third RS set 210-c, or a combination thereof). In some examples, the RS configuration 205 may be transmitted via a downlink control information (DCI) message, a Radio Resource Control (RRC) message, a Medium Access Control (MAC) control element (CE) (MAC-CE) message, or any combination thereof.

The RS configuration 205 may indicate multiple sets of beams (e.g., measurement resources along the beam space) used for communicating the RSs (e.g., RS sets 210) indicated by the RS configuration 205. For example, the RS configuration 205 may indicate high-frequency, medium-frequency, and low-frequency beam sets (e.g., corresponding to an existing procedure for periodic and/or semi-persistent RS reports, such as CSI reports). In some examples, the RS configuration 205 may indicate a first set of beams associated with the RS set 210-a and a second set of beams associated with the second RS set 210-b. In some cases, the RS configuration 205 may indicate one or more other sets of beams. For example, the RS configuration 205 may indicate a third set of beams associated with a third RS set 210-c. In some cases, one RS configuration 205 may configure the UE 115-a with all of the high-frequency, medium-frequency, and low-frequency beam sets corresponding to different RS sets 210. Alternatively, a combination of RS configurations 205 may configure the UE 115-a with the high-frequency, medium-frequency, and low-frequency beam sets corresponding to different RS sets 210.

The base station 105-a may configure the UE 115-a to perform measurements for each beam set. For example, the RS configuration 205 may configure the UE 115-a to perform high-frequency RS measurements for one set of beams (e.g., the first set of beams) and low-frequency measurements for another set of beams (e.g., the second set of beams). In some cases, the RS configuration 205 may indicate periodicities for each set of beams. The RS configuration 205 may indicate a first periodicity associated with the first set of beams and a second periodicity associated with the second set of beams. For example, the first periodicity may be indicated for measuring the first RS set 210-a on the first set of beams, and the second periodicity may be indicated for measuring the second RS set 210-b on the second set of beams. In some cases, the second periodicity may be different than the first periodicity. For example, the first periodicity may be a lower periodicity and the second periodicity may be a higher periodicity.

RS measurements performed by the UE 115-a on the RS sets 210 may have a dependence across time resources and spatial resources (e.g., beams, beam sets). For machine learning applications, based on the dependence and correlation of the measurements in one or more dimensions (e.g., in time and space), the density of RS resources as well as their measurement frequency may be adjusted. For example, a wireless system may leverage the dependence between resources to down-sample RS measurements in time, frequency, or both. In some cases, how frequently a UE 115 measures RS resources (e.g., CSI-RS resources) in time may be determined based on channel coherence time, and similar other concepts may apply to a frequency dimension. In some cases, the base station 105-a may configure the UE 115-a to down-sample measurements across time resources (e.g., measurement opportunities at indicated periodicities) and spatial resources (e.g., beam space or beam sets), such that beams may be measured at a respective frequency, using a predefined pattern (e.g., a pattern based on machine learning algorithms, neural network algorithms). With high-frequency, medium-frequency, and low-frequency measurements across different beams, the beams may be measured over time with different periodicities. In such examples, all of the beams are measured at least at a low frequency, if not a medium frequency or a high frequency.

The respective periodicities described herein may correspond to periodicities stored at the UE 115-a and indicated by an index or other indicator, or to periodicities explicitly indicated by the base station 105-a. For example, the RS configuration 205 may explicitly indicate the respective periodicities (e.g., via a field or indicator in the RS configuration 205) or the RS configuration 205 may indicate the respective periodicities via an index (e.g., the UE 115-a a may be pre-configured by a table, codebook, or another configuration that indicates one or more indices corresponding to the periodicities).

The UE 115-a may select (e.g., identify, determine) a first set of beams and a first periodicity for measuring the first RS set 210-a on the first set of beams based on one or more parameters indicated by the RS configuration 205 (e.g., the indication of the first periodicity). Additionally, the UE 115-a may select a second set of beams and a second periodicity for measuring the second RS set 210-b on the second set of beams based on one or more other parameters indicated by the RS configuration 205 (e.g., the indication of the second periodicity). For example, the UE 115-a may select one or more sets of beams, one or more periodicities, or some combination thereof, based on the RS configuration 205 or one or more parameters indicated by the RS configuration 205. In some cases, the UE 115-a may select a third set of beams and a third periodicity for measuring a third RS set 210-c on the third set of beams. For example, the UE 115-a may select the third set of beams and the respective periodicity based on one or more parameters indicated by the RS configuration 205 (e.g., the indication of the third periodicity).

The base station 105-a may transmit one or more RS sets 210 to the UE 115-a according to the RS configuration 205. For example, the UE 115-a may monitor a wireless channel for the first RS set 210-a and the second RS set 210-b. The first RS set 210-a may be communicated via the first set of beams according to the first periodicity, and the second RS set 210-b may be communicated via the second set of beams according to the second periodicity. In some cases, the UE 115-a may measure the one or more RSs of each RS set 210 according to their respective periodicity. For example, UE 115-a may measure an RS of the RS set 210-a during a configured measurement opportunity (e.g., period of time) associated with the first periodicity. Additionally, the UE 115-a may measure the one or more RSs of the RS set 210-b during a configured measurement opportunity associated with the second periodicity.

In some cases, monitoring for the first RS set 210-a may partially overlap with monitoring for the second RS set 210-b. For example, the UE 115-a may measure at least a portion of one or more of the RSs of the first RS set 210-a while also measuring at least a portion of one or more of the RSs of the second RS set 210-*b* (e.g., during at least a portion of the same measurement opportunity). In some cases, the UE 115-*a* may monitor for a third RS set 210-*c*, and the third RS set 210-*c* may be communicated via a third set of beams according to a third periodicity. The UE 115-*a* may monitor for and receive each RS set 210 using a respective set of parameters indicated by the RS configuration 205. According to such configurations, the wireless communications system may identify an accurate (e.g., higher accuracy) set of beams for beam failure recovery (BFR) (e.g., because beam sets are changed and maintained, rather than dropped).

The UE 115-*a* may transmit a measurement report 215 to the base station 105-*a* based on monitoring for the first RS set 210-*a*, the second RS set 210-*b*, the third RS set 210-*c*, or a combination thereof. For example, the measurement report may be a Layer 1 (L1) report (e.g., L1-RS Received Power (RSRP) (L1-RSRP)). In some cases, the measurement report 215 may indicate a subset of beams. For example, the subset of beams may include a quantity of one or more beams from the first set of beams, the second set of beams or a combination thereof. In some cases, the subset of beams may include a quantity of beams with a highest communication quality (e.g., a top N beams).

In some cases, the base station 105-*a* may identify a change to make to the one or more beam sets or to the one or more periodicities. In some examples, the change may be identified based on the measurement report 215 (e.g., among other examples). For example, based on the measurement report 215 from the UE 115-*a*, the allocation of beams to the high-frequency, medium-frequency, and low-frequency beam sets may be updated (e.g., based on a rule defined by a wireless communications standard). For example, if a beam from the low-frequency beam or the medium-frequency beam set is reported as one of the top beams in the measurement report, the base station 105-*a* identify that the beam should be changed to the high-frequency measurement beam set.

Additionally or alternatively, if a beam of the high-frequency beam set is not reported as one of the top beams in the measurement report, the base station 105-*a* may identify that the beam should be changed to a lower-frequency measurement beam set (e.g., the medium-frequency beam set of the low-frequency beam set). In some examples, the base station 105-*a* may identify a change that includes a combination of changes (e.g., adjusting more than one beam, beam set, or periodicity). In some cases, the change may be based on the subset of beams, the communication quality of each beam, or some combination thereof. In some examples, the base station 105-*a* may use a machine learning algorithm or the outcome of the machine learning algorithm to identify the change. For example, the base station 105-*a* may identify one or more adjustments to make to the configuration (e.g., adjusting one or more beams within the different subsets, adjustments to a periodicity of a subset) using a machine learning algorithm (e.g., an advanced neural network) which may not have been identifiable using other techniques. In some cases, for example, analysis of different combinations of beams, as well as RSs and and periodicities associated therewith, may be relatively complex (e.g., computationally complex, requiring more processing time and/or power) for other techniques.

In some examples, the wireless communications system 200 may support configuration updates based on the identified change. For example, the base station 105-*a* may transmit one control message 220 (e.g., a DCI or MAC-CE) to indicate an update to the RS configuration 205 according to the identified change, such as a change to one or more beam sets or to one or more periodicities (e.g., as opposed to signaling a new configuration). For example, the control message 220 may move beams from a first set to a second set by indicating the changes of beams across sets (e.g., a delta value), rather than indicating a new configuration. In this way, the base station 105-*a* may avoid indicating changes to the RS configuration 205 using a new (e.g., different) configuration for each beam set (e.g., a high-frequency configuration, medium-frequency configuration, and low-frequency configuration), which may be associated with signaling a respective control message 220 (e.g., larger control messages 220) for each configuration.

In some examples, the control message 220 may be transmitted via a DCI message, a RRC message, a MAC-CE message, or any combination thereof. In some cases, the UE 115-*a* and the base station 105-*a* may automatically update the RS configurations without control messaging from the base station 105-*a*. For example, the allocation of beams to the high-frequency, medium-frequency, and low-frequency measurement sets may be updated based on a rule defined by a wireless communications standard (e.g., in response to results of the measurements or to the measurement report associated with the RS sets 210).

The UE 115-*a* may monitor the wireless channel for the first RS set 210-*a*, the second RS set 210-*b*, the third RS set 210-*c*, or some combination thereof according to the configuration update indicated by the control message 220. For example, the first RS set 210-*a* may be communicated via the first set of beams according to updated beams of the first set of beams, according to a new value of the first periodicity, or both. Additionally or alternatively, the second RS set 210-*b* may be communicated via the second set of beams according to updated beams of the second set of beams, according to a new value of the second periodicity, or both.

In some cases, (e.g., when a periodicity is updated) the UE 115-*a* may measure one or more of the RSs of an RS set 210 according to a new periodicity. For example, the UE 115-*a* may measure an RS of the first RS set 210-*a* during a new measurement opportunity associated with the updated first periodicity, which may be different from the measurement opportunity associated with the prior first periodicity (e.g., before the update). In some cases, the new measurement opportunity may an example of updated measurement resources (e.g., time resources) used by the UE 115-*a* to measure the RS set 210-*a*. In some cases, one or more of the other RS sets 210 (e.g., the second RS set 210-*b*, the third RS set 210-*c*, or both) may similarly be communicated via updated sets of beams or according to updated periodicities.

Figure 3:
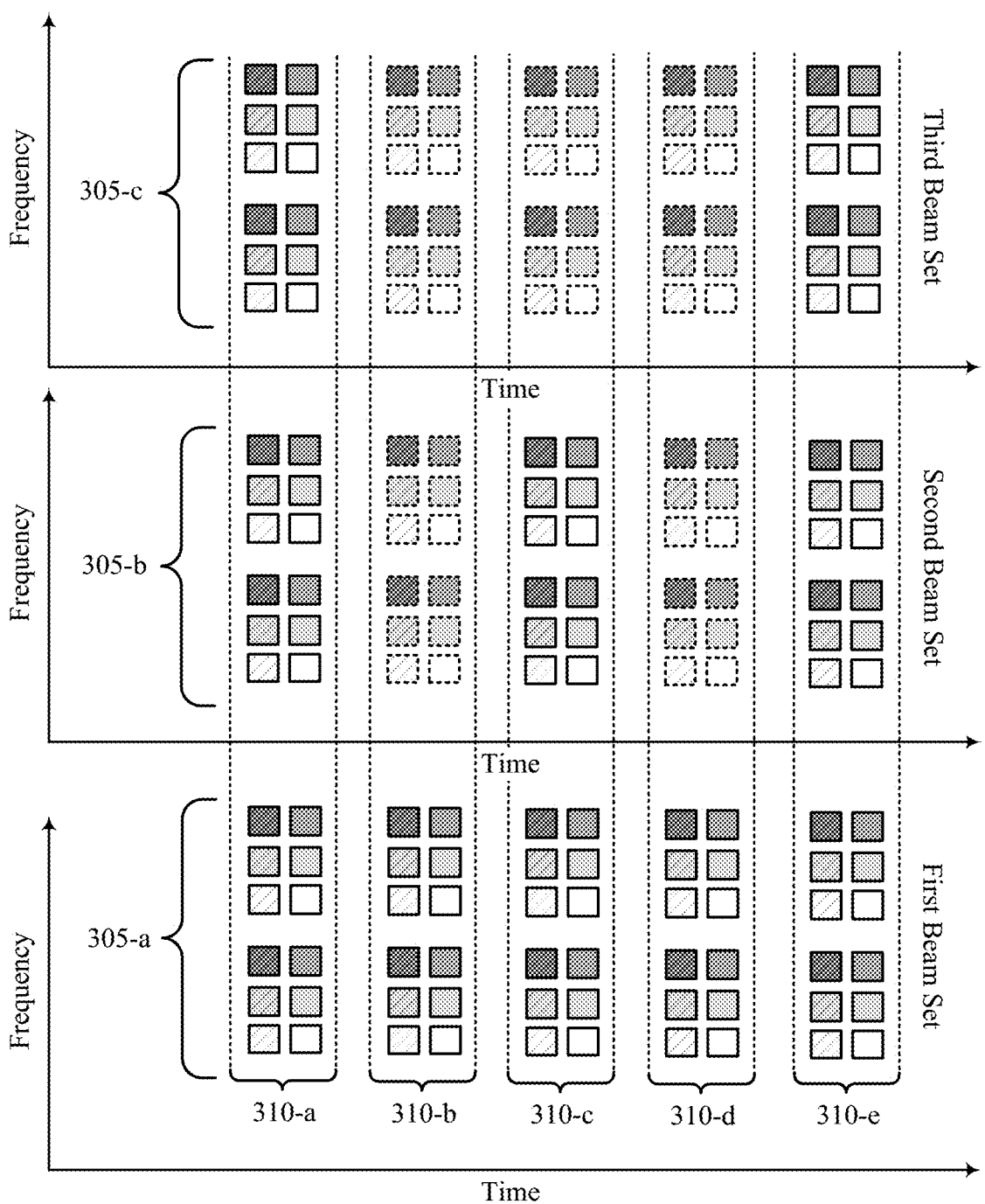
FIG. 3 illustrates an example of a resource measurement configuration that supports RS periodicities for multiple sets of beams in accordance with aspects of the present disclosure.

FIG. 3 illustrates an example of resource measurement configuration 300 that supports RS periodicities for multiple sets of beams in accordance with aspects of the present disclosure. In some examples, the resource measurement configuration 300 may implement aspects of the wireless communications system 100 or 200 or may be implemented by aspects of the wireless communications system 100 or 200 as described with reference to FIGS. 1 and 2. For example, the resource measurement configuration 300 may be implemented by a base station 105 and a UE 115 for measurement of RSs on beam sets associated with different periodicities, as described with reference to FIG. 2.

The resource measurement configuration 300 may illustrate various beam sets and periodicities for performing measurements of associated RS sets. Resources 305-*a*, 305-*b*, and 305-*c* may each include a respective resource set associated with a corresponding beam set. For example, the resources within 305-*a* may be resources for high-frequency measurements, the resources of 305-*b* may be resources for medium-frequency measurements, and the resources of 305-*c* may be resources for low-frequency measurements. Additionally, the high-frequency resources of 305-*a* may be associated with a first beam set, the medium-frequency resources of 305-*b* may be associated with a second beam set, and the low-frequency resources of 305-*c* may be associated with a third beam set. In some cases, the beam sets may be considered high-frequency beam sets, medium-frequency beam sets, and low-frequency beam sets, based on the associated resources 305. In some cases, resources 305-*a*, 305-*b*, and 305-*c* may represent same frequency resources, used for different beams at different times. In some cases, resources 305-*a*, 305-*b*, and 305-*c* may represent different frequency resources.

The frequency, or periodicity, for measuring the resources 305 may result in measurement at different time periods 310 (e.g., slots, frames, symbols) for different beam sets, where the time periods 310 may represent contiguous or non-contiguous time periods 310. For example, the resources 305-*a* (e.g., measurement opportunities) may be measured at time periods 310-*a* 310-*b*, 310-*c*, 310-*d*, and 310-*e* over the first beam set (e.g., according to the first periodicity associated with the first beam set). Similarly, the resources 305-*b* may be measured at time periods 310-*a*, 310-*c*, and 310-*e* over the second beam set (e.g., according to the second periodicity associated with the second beam set), and the resources 305-*c* may be measured at time periods 310-*a* and 310-*e* by the third beam set.

In this example, the first beam set may be measured during every time period (e.g., time periods 310-*a*, 310-*b*, 310-*c*, 310-*d*, and 310-*e*). However, the second beam set may be measured during every other time period (e.g., the resources 305-*b* may be measured at 310-*a*, 310-*c*, and 310-*e* and not at 310-*b* and 310-*d*). Additionally, the third beam set may be measured during even fewer time periods (e.g., the resources 305-*c* may be measured at 310-*a* and 310-*e* but not at 310-*b*, 310-*c*, or 310-*d*).

The measurement activity over the time periods 310 may be illustrative of both the frequency and the periodicity associated with each beam set. For example, the first beam set may be associated with a lower measurement periodicity and a higher frequency (e.g., using every, or nearly every, time period 310, every measurement opportunity). The second beam set may be associated with a comparatively higher measurement periodicity or lower frequency (e.g., skipping every other measurement opportunity, every other time period 310). Similarly, the third beam set may be associated with a highest comparative periodicity and lowest comparative frequency (e.g., with multiple time periods 310 between measurements).

Figure 4A:
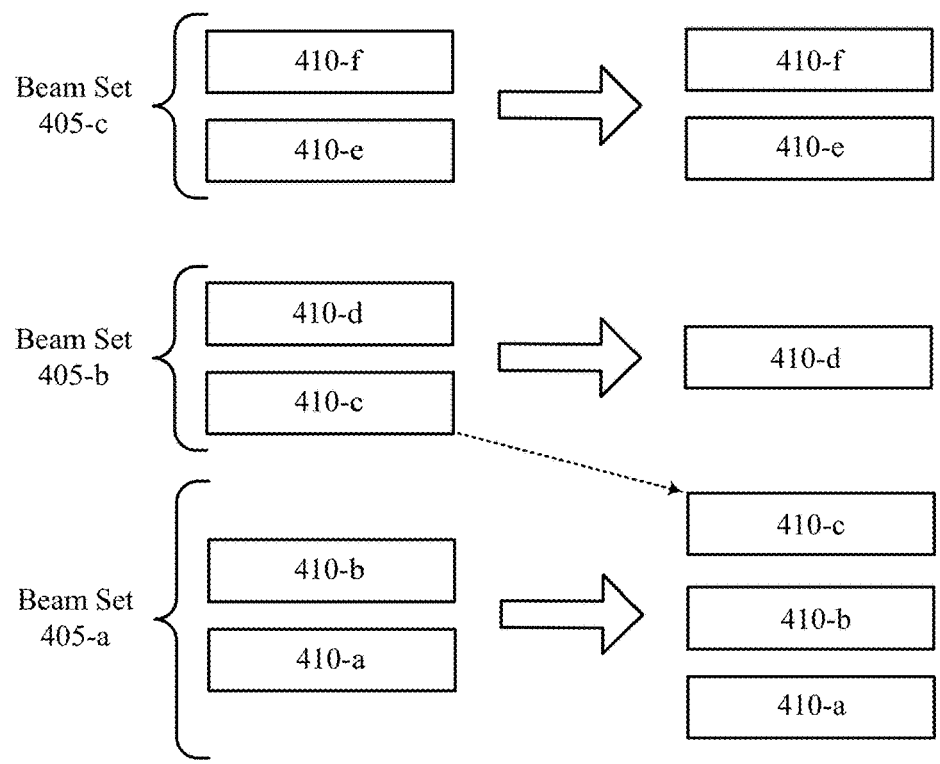
FIGS. 4A and 4B illustrate examples of beam set configurations that support RS periodicities for multiple sets of beams in accordance with aspects of the present disclosure.
Figure 4B:
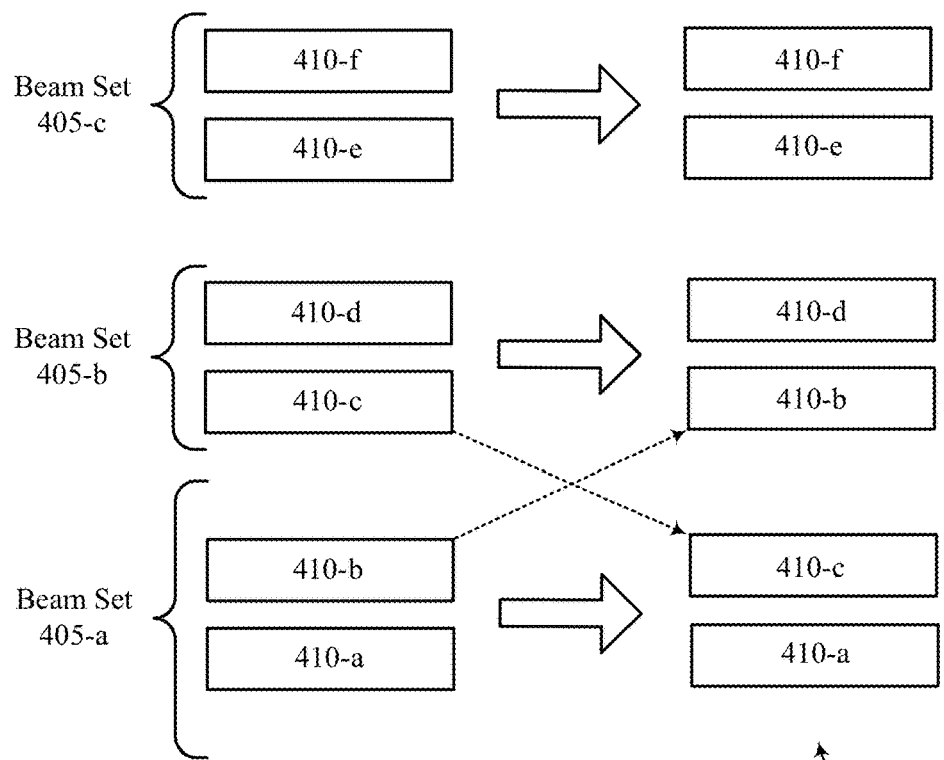

FIGS. 4A and 4B illustrate examples of beam set configurations 401 and 402 that support RS periodicities for multiple sets of beams in accordance with aspects of the present disclosure. In some examples, the beam set configurations 401 and 402 may implement aspects of the wireless communications system 100 and 200 or may be implemented by aspects of the wireless communications system 100 or 200 as described with reference to FIGS. 1 and 2. For example, the beam set configuration 401, 402, or both, may be implemented by a base station 105 and a UE 115 for measurement of RSs on beam sets 405 associated with different periodicities, as described with reference to FIGS. 2 and 3.

As described with reference to FIG. 2, one or more beam sets 405 may be updated by the base station 105 (e.g., via a control message transmitted by the base station 105) or by the base station 105 and the UE 115 (e.g., based on a known rule). For example, the base station 105 may transmit a control message indicating to move one or more beams 410 between beam sets 405. In some examples, the control message may indicate for the UE 115 (e.g., and the base station) to move one or more beams 410 from one beam set 405 to another beam set 405, or to switch beams 410 between beam sets 405.

In one example, beam set 405-*a*, beam set 405-*b*, and beam set 405-*c* may be configured by the base station 105, and may each include one or more respective beams 410. For example, beam set 405-*a* may include beam 410-*a* and beam 410-*b*, beam set 405-*b* may include beam 410-*c* and beam 410-*d*, and beam set 405-*c* may include beam 410-*e* and beam 410-*f*. Each beam set 405 may be associated with a respective periodicity for RS measurements, as described with reference to FIGS. 2 and 3. For example, beam set 405-*a* may have a lowest periodicity and highest frequency for RS measurements and beam set 405-*c* may have a highest periodicity and lowest frequency for RS measurements, while beam set 405-*b* may have an intermediate periodicity and frequency for RS measurements.

As described herein, one or more of the beam sets 405 may be updated (e.g., by the base station 105, by the base station 105 and the UE 115), such that one or more beams 410 may be moved from one beam set 405 to one of the other beam sets 405. For example, as shown in FIG. 4A, beam 410-*c* may be moved from beam set 405-*b* to beam set 405-*a*. Consequently, beam set 405-*a* may include beam 410-*a*, beam 410-*b*, and beam 410-*c*, and beam set 405-*b* may include beam 410-*d*. In some examples, one or more of the other beam sets 405 may not be changed by the updated configuration. For example, beam set 405-*c* may maintain beams 410-*e* and 410-*f*. In some cases, other beams 410 of other beam sets 405 (e.g., of beam set 405-*c*) may be changed by the updated configuration.

Additionally or alternatively, one or more of the beam sets 405 may be updated (e.g., by the base station 105, by the base station 105 and the UE 115), such that beams 410 may be switched between beam sets 405. For example, as shown in FIG. 4B, beam 410-*c* may be moved from beam set 405-*b* to beam set 405-*a* and beam 410-*b* may be moved from beam set 405-*a* to beam set 405-*b* (e.g., in response to a change in beam ranking, as described with reference to FIG. 2). Consequently, beam set 405-*a* may include beam 410-*a* and beam 410-*c*, and beam set 405-*b* may include beam 410-*d* and beam 410-*b*. In some examples, one or more of the other beam sets 405 may not be changed by the updated configuration. For example, beam set 405-*c* may maintain beams 410-*e* and 410-*f*. In some cases, other beams 410 of other beam sets 405 (e.g., of beam set 405-*c*) may be changed by the updated configuration.

Figure 5:
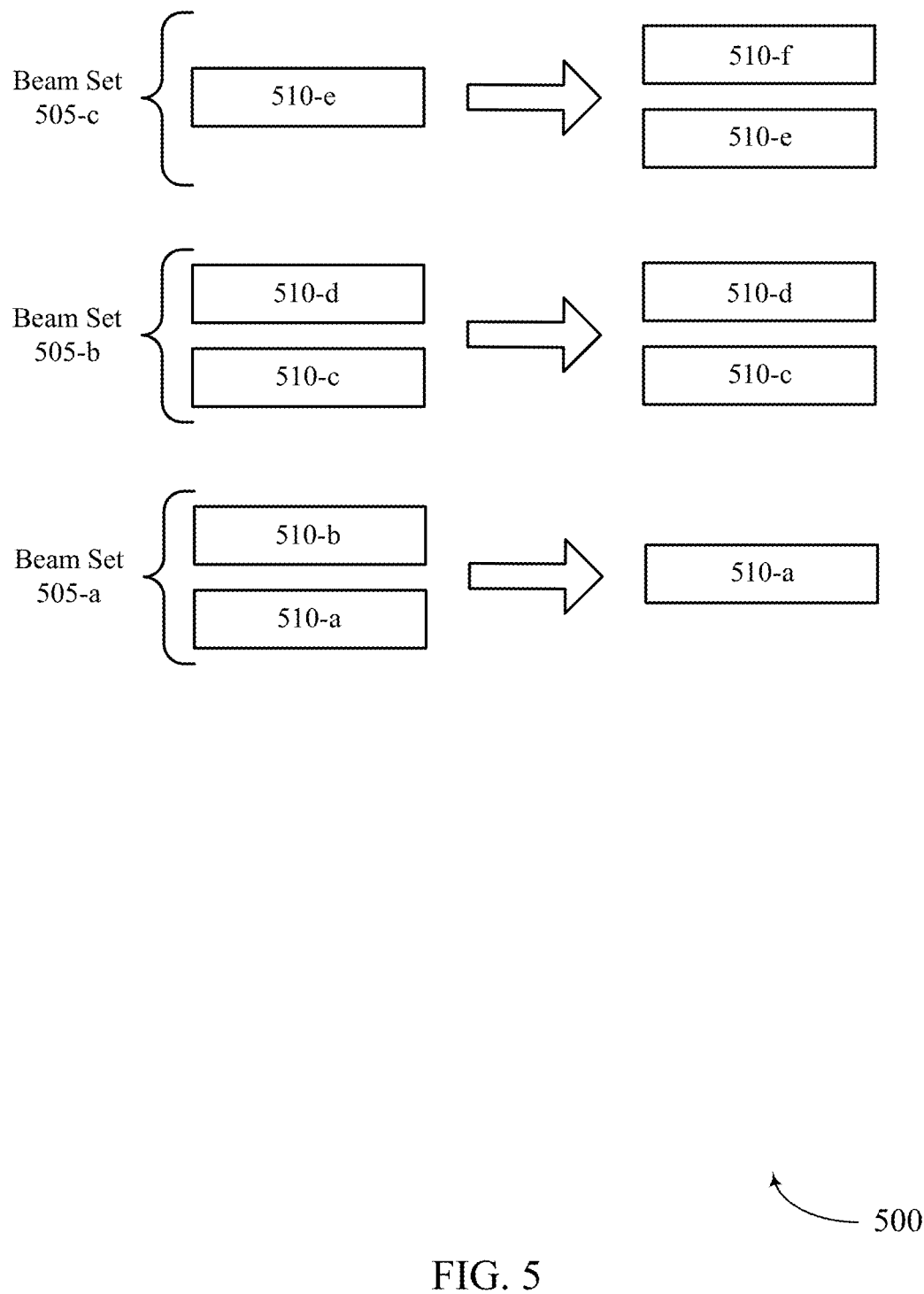
FIG. 5 illustrates an example of a beam set configuration that supports RS periodicities for multiple sets of beams in accordance with aspects of the present disclosure.

FIG. 5 illustrates an example of a beam set configuration 500 that supports RS periodicities for multiple sets of beams in accordance with aspects of the present disclosure. In some examples, the beam set configuration 500 may implement aspects of the wireless communications system 100 and 200 or may be implemented by aspects of the wireless communications system 100 or 200 as described with reference to FIGS. 1 and 2. For example, the beam set configuration 500 may be implemented by a base station 105 and a UE 115 for measurement of RSs on beam sets 505 associated with different periodicities, as described with reference to FIGS. 2 and 3.

As described with reference to FIG. 2, one or more beam sets 505 may be updated by the base station 105 (e.g., via a control message transmitted by the base station 105) or by the base station 105 and the UE 115 (e.g., based on a known rule). For example, the base station 105 may transmit a control message indicating to remove one or more beams 510 of one or more beam sets. Additionally or alternatively, the control message may indicate to add one or more beams 510 to the one or more beam sets 505. For example, the control message may indicate to remove one or more beams 510 from one beam set 505 and/or to add one or more beams 510 to the same or another beam set 505.

In one example, beam set 505-*a*, beam set 505-*b*, and beam set 505-*c* may be configured by the base station 105, and may each include one or more respective beams 510. For example, beam set 505-*a* may include beam 510-*a* and beam 510-*b*, beam set 505-*b* may include beam 510-*c* and beam 510-*d*, and beam set 505-*c* may include beam 510-*e*. Each beam set 505 may be associated with a respective periodicity for RS measurements, as described with reference to FIGS. 2 and 3. For example, beam set 505-*a* may have a lowest periodicity and highest frequency for RS measurements and beam set 505-*c* may have a highest periodicity and lowest frequency for RS measurements, while beam set 505-*b* may have an intermediate periodicity and frequency for RS measurements.

As described herein, one or more beam sets 505 may be updated (e.g., by the base station 105, by the base station 105 and the UE 115), such that one or more beams 510 of the beam sets 505-*a*, 505-*b*, or 505-*c* may be removed, or such that a new beam 510 may be added. For example, beam 510-*b* may be removed from beam set 505-*a*, such that beam set 505-*a* may include beam 510-*a* (e.g., and not beam 510-*b*). Additionally or alternatively, beam 510-*f* may be added to beam set 505-*c*, such that beam set 505-*c* may now include beam 510-*e* and beam 510-*f*. In some examples, one or more of the other beam sets 505 may not be changed by the updated configuration. For example, beam set 505-*b* may maintain beam 510-*c* and 510-*d*. In some cases, other beams 510 of other beam sets 505 (e.g., of beam set 505-*b*) may be changed by the updated configuration.

Figure 6:
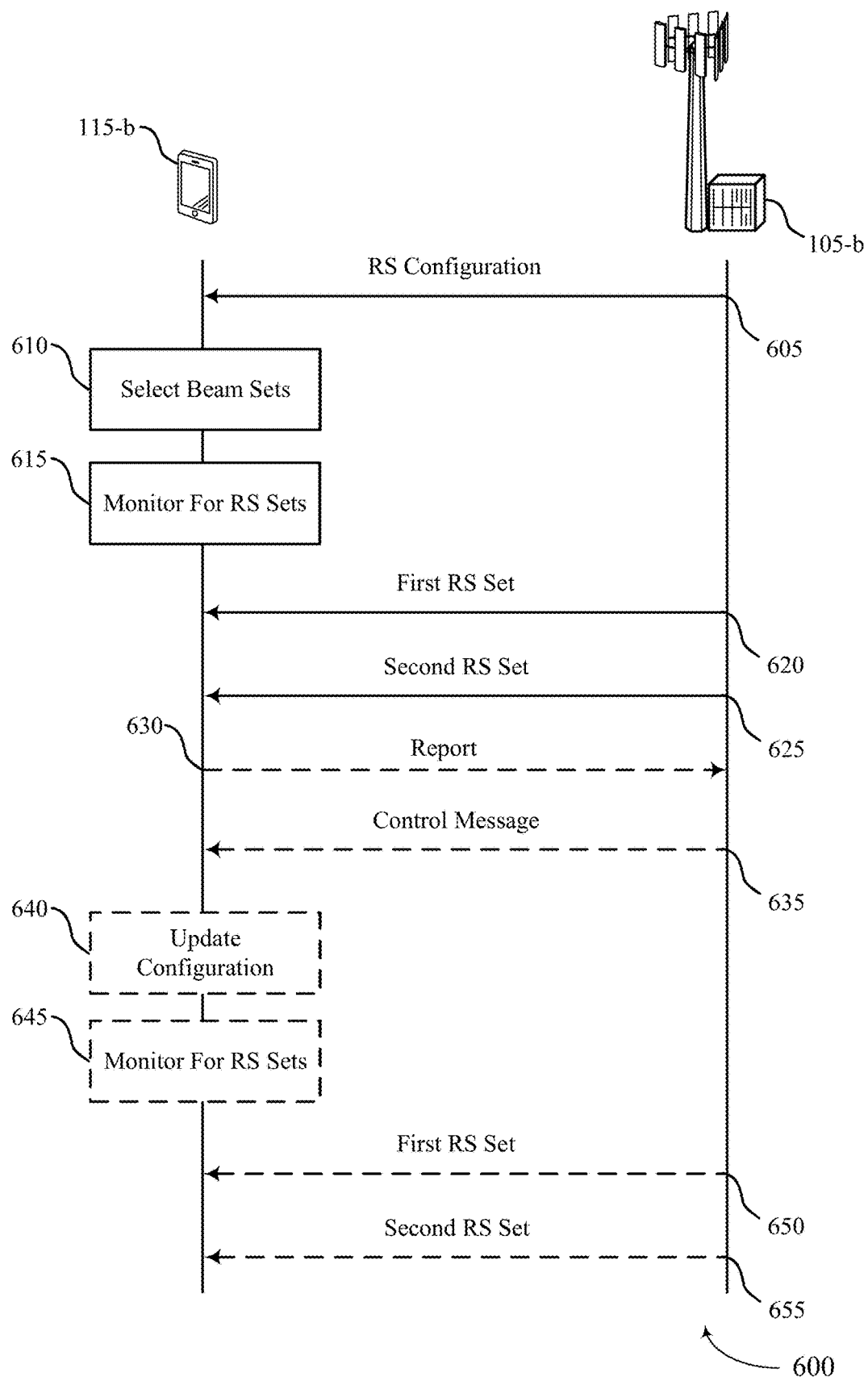
FIG. 6 illustrates an example of a process flow that supports RS periodicities for multiple sets of beams in accordance with aspects of the present disclosure.

FIG. 6 illustrates an example of a process flow 600 that supports RS periodicities for multiple sets of beams in accordance with aspects of the present disclosure. In some examples, the process flow 600 may implement aspects of the wireless communications system 100 and 200 or may be implemented by aspects of the wireless communications system 100 or 200 as described with reference to FIGS. 1 and 2. For example, the process flow 600 may be implemented by a UE 115-*b* and a base station 105-*b*, which may be examples of corresponding devices as described herein. In some cases, the process flow 600 may implement or be implemented by aspects of the resource measurement configuration 300 described with reference to FIG. 3, or one or more of the beam set configurations 401, 402, and 500 described with reference to FIGS. 4A, 4B, and 5.

In the following description of the process flow 600, the operations between the UE 115-*b* and the base station 105-*b* may be transmitted in a different order than the example order shown, or the operations performed by the UE 115-*b* and the base station 105-*b* may be performed in different orders or at different times. Some operations may also be omitted from the process flow 600, and other operations may be added to the process flow 600. Although UE 115-*b* and base station 105-*b* are shown performing the operations of process flow 600, some aspects of some operations may also be performed by one or more other wireless devices.

At 605, the base station 105-*b* may transmit an RS configuration to the UE 115-*b*. The RS configuration may indicate a configuration for one or more RS measurements of one or more RS sets. The one or more RS sets may correspond to RS sets known to the UE 115-*b* (e.g., RS sets stored at the UE 115-*b* and indicated by an index or other indicator), or to RS sets explicitly indicated by the base station 105-*b*. The RS configuration may also indicate multiple sets of beams used for communicating the RSs indicated by the RS configuration. For example, the RS configuration may indicate high-frequency, medium-frequency, and low-frequency beam sets, where the frequency of each beam set may correspond to a measurement frequency for the associated RSs.

In some examples, the RS configuration may indicate a first set of beams associated with a first RS set and a second set of beams associated with a second RS set. In some cases, the RS configuration may indicate one or more other sets of beams. The RS configuration may also indicate a respective periodicity for each set of beams. For example, the RS configuration may indicate a first periodicity associated with the first set of beams and a second periodicity associated with the second set of beams. The respective periodicities may correspond to periodicities known to the UE 115-*b* (e.g., and indicated by an index or indicator), or to periodicities explicitly indicated by the base station 105-*b*. For example, the RS configuration may explicitly indicate the respective periodicities, or the RS configuration may indicate the respective periodicities via an index.

At 610, the UE 115-*b* may select one or more beam sets (e.g., based on the RS configuration). In some cases, the UE 115-*b* may select beam sets based on sets of beams indicated by the RS configuration. The UE 115-*b* may also select one or more periodicities associated with each beam set. For example, the UE 115-*b* may identify a first beam set as a high-frequency beam set, a second beam set as a medium-frequency beam set, and a third beam set as a low-frequency beam set, where each frequency may be associated with one or more measurement opportunities or measurement resources.

At 615, the UE 115-*b* may monitor a wireless channel for the first RS set and the second RS set indicated by the RS configuration. For example, the UE 115-*b* may monitor the first set of beams during measurement opportunities associated with the first periodicity in order to measure the first RS set, and may monitor the second set of beams during measurement opportunities associated with the second periodicity in order to measure the second RS set. In some cases, the UE 115-*b* may monitor for both RS sets at a same time, or at least partially overlapping time. For example, a measurement opportunity associated with the first periodicity may overlap with a measurement opportunity associated with the second periodicity.

At 620, the base station 105-*b* may transmit the first RS set via the first set of beams, according to the first periodicity. At 625, the base station 105-*b* may transmit the second RS set via the second set of beams, according to the second periodicity. In some cases, the base station 105-*b* may transmit at least a part of the first RS set at least partially overlapping with transmitting at least a part of the second RS set. The UE 115-*b* may receive and measure each RS set using a respective set of parameters indicated by the RS configuration 205 (e.g., the beam sets, periodicities, measurement resources, or a combination thereof).

In some cases, the UE 115-*b* may transmit a measurement report at 630. In some cases, the measurement report may be based on monitoring for the first RS set, the second RS set, or both. In some cases, the measurement report may indicate a subset of beams. For example, the subset of beams may include a quantity of one or more beams from the first set of beams, the second set of beams, or a combination thereof, where the subset of beams may include a quantity of beams with a highest communication quality (e.g., a top N beams). In some cases, the base station 105-*b* may identify a change to make to the one or more beam sets or to the one or more periodicities based on the measurement report. For example, the base station 105-*b* may identify a new allocation of beams to the high-frequency, medium-frequency, and low-frequency measurement sets based on the subset of beams, the communication quality of each beam, or some combination thereof. In some examples, the base station 105-*b* may identify a change that includes a combination of changes (e.g., adjusting more than one beam, beam set, or periodicity). In some examples, the base station 105-*b* may use a machine learning algorithm to identify the change.

In some cases, at 635, the base station 105-*b* may transmit a control message indicating an update to the RS configuration. For example, the control message transmitted at 635 may indicate an update to the RS configuration transmitted at 605. In some cases, the control message may include an indication of the changes of beams across the beam sets (e.g., a delta value). In some cases, one or more beams or periodicities of one or more beam sets may be unchanged by the control message.

In some cases, the control message may indicate to move one or more beams of one or more sets of beams. In some examples, the control message may indicate to move one or more beams from the first set of beams to the second set of beams, to move one or more beams from the second set of beams to the first set of beams, or some combination thereof. Additionally or alternatively, the control message may indicate to move some other combination of beams to and from some other combination of sets of beams.

In some cases, the control message may indicate to add one or more beams to the one or more sets of beams. For example, the control message may indicate one or more beams to be added to the first beam set, the second beam set, or some combination thereof. In some examples, the indicated beams may not be included in the first beam set, the second beam set, or any other beam set, before they are indicated.

In some cases, the control message may indicate to remove one or more beams from the one or more sets of beams. For example, the control message may indicate one or more beams to be removed from the first beam set, the second beam set, or some combination thereof. In some cases, the indicated beams (e.g., the removed beams) may not be added or moved to the first beam set, the second beam set, or any other beam set.

In some cases, the control message may indicate an updated value to the one or more periodicities. For example, the control message may indicate a new value for the first periodicity, the second periodicity, or some combination thereof. In some examples, the control message may indicate a new value that is different from the first periodicity, the second periodicity, or another periodicity. Additionally or alternatively, the control message may indicate a new value that is the same as the first periodicity, the second periodicity, or another periodicity.

In some cases, the UE 115-*b* may update the RS configuration at 640. For example, the RS configuration may be updated based on the control message shown at 635. Additionally or alternatively, the RS configuration may be updated by the UE 115-*b*, the base station 105-*b*, or both, such as based on a known or configured rule. In some cases, the update may include reallocating beams to the first beam set, second beam set, or both, as described herein. Additionally or alternatively, the update may include adding or removing beams from the first beam set, second beam set, or both, as described herein. Additionally or alternatively, the update may include updating the first periodicity, the second periodicity, or both, to new periodicities, as described herein.

In some cases, the UE 115-*b* may monitor the wireless channel for the first RS set and the second RS set at 645. For example, the UE 115-*b* may monitor the first set of beams according to an updated RS configuration for the first RS set (e.g., different beams for the first beam set, a different first periodicity, or both) and monitor the second set of beams according to an updated RS configuration for the second RS set (e.g., different beams for the second beam set, a different second periodicity, or both).

In some cases, the base station 105-*b* may transmit the first RS set at 650. The first RS set transmitted at 650 may be communicated according to the updates indicated by the control message at 635 or updated by the UE 115-*b* and the base station 105-*b*. For example, the first RS set may be transmitted according to an updated first periodicity, different than the first periodicity used at 620. Additionally or alternatively, the first RS set may be transmitted via an updated first beam set, which may be different than the first beam set used at 620.

In some cases, the base station 105-*b* may transmit the second RS set at 655. The second RS set transmitted at 655 may be communicated according to the updates indicated by the control message at 635 or updated by the UE 115-*b* and the base station 105-*b*. For example, the second RS set may be transmitted according to an updated second periodicity, different than the second periodicity used at 625. Additionally or alternatively, the second RS set may be transmitted via an updated second beam set, which may be different than the second beam set used at 625.

Figure 7:
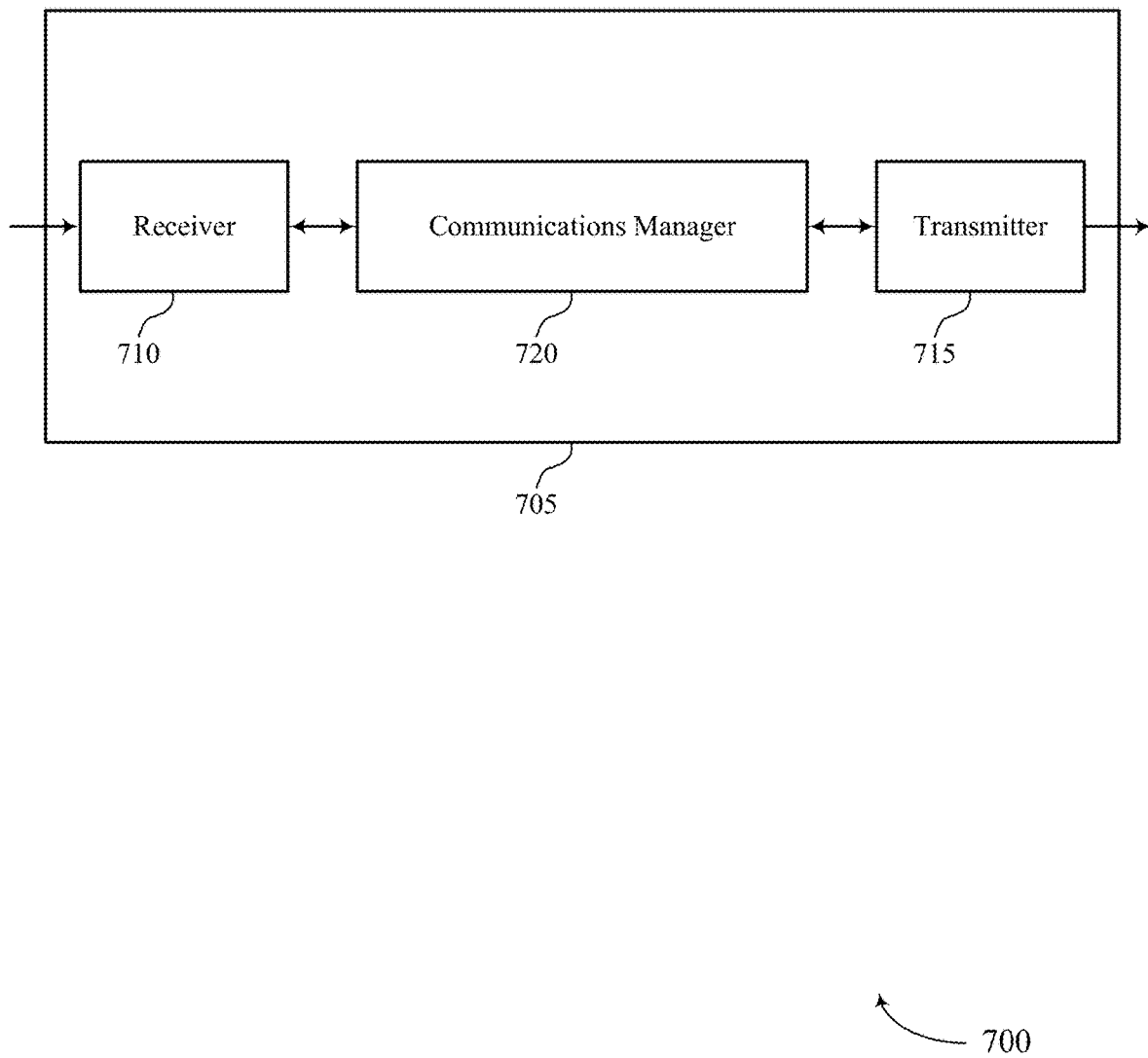
FIGS. 7 and 8 show block diagrams of devices that support RS periodicities for multiple sets of beams in accordance with aspects of the present disclosure.

FIG. 7 shows a block diagram 700 of a device 705 that supports RS periodicities for multiple sets of beams in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to RS periodicities for multiple sets of beams). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to RS periodicities for multiple sets of beams). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of RS periodicities for multiple sets of beams as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

Additionally or alternatively, the communications manager 720 may support wireless communication at a UE in accordance with examples as disclosed herein. For example, the communications manager 720 may be configured as or otherwise support a means for receiving, from a network node, an indication of a configuration for RS measurements. The communications manager 720 may be configured as or otherwise support a means for selecting, based on the configuration, a first set of beams, a first periodicity for measuring RSs on the first set of beams, a second set of beams, and a second periodicity for measuring RSs on the second set of beams, where the second periodicity is different than the first periodicity. The communications manager 720 may be configured as or otherwise support a means for monitoring a wireless channel for a first set of RSs communicated via the first set of beams according to the first periodicity. The communications manager 720 may be configured as or otherwise support a means for monitoring the wireless channel for a second set of RSs communicated via the second set of beams according to the second periodicity.

The actions performed by the communications manager 720, among other examples herein, may be implemented to realize one or more potential advantages. For example, communications manager 720 may increase available battery power and communication quality at a wireless device (e.g., a UE 115) by supporting different RS periodicities for different beam sets, which may increase communication quality at the wireless device by supporting dynamic changes to RS monitoring periodicities. The increase in communication quality may result in increased link performance and decreased overhead based on the different RS periodicities. Accordingly, communications manager 720 may save power and increase battery life at a wireless device (e.g., a UE 115) by strategically increasing a quality of communications at a wireless device (e.g., a UE 115).

Figure 8:
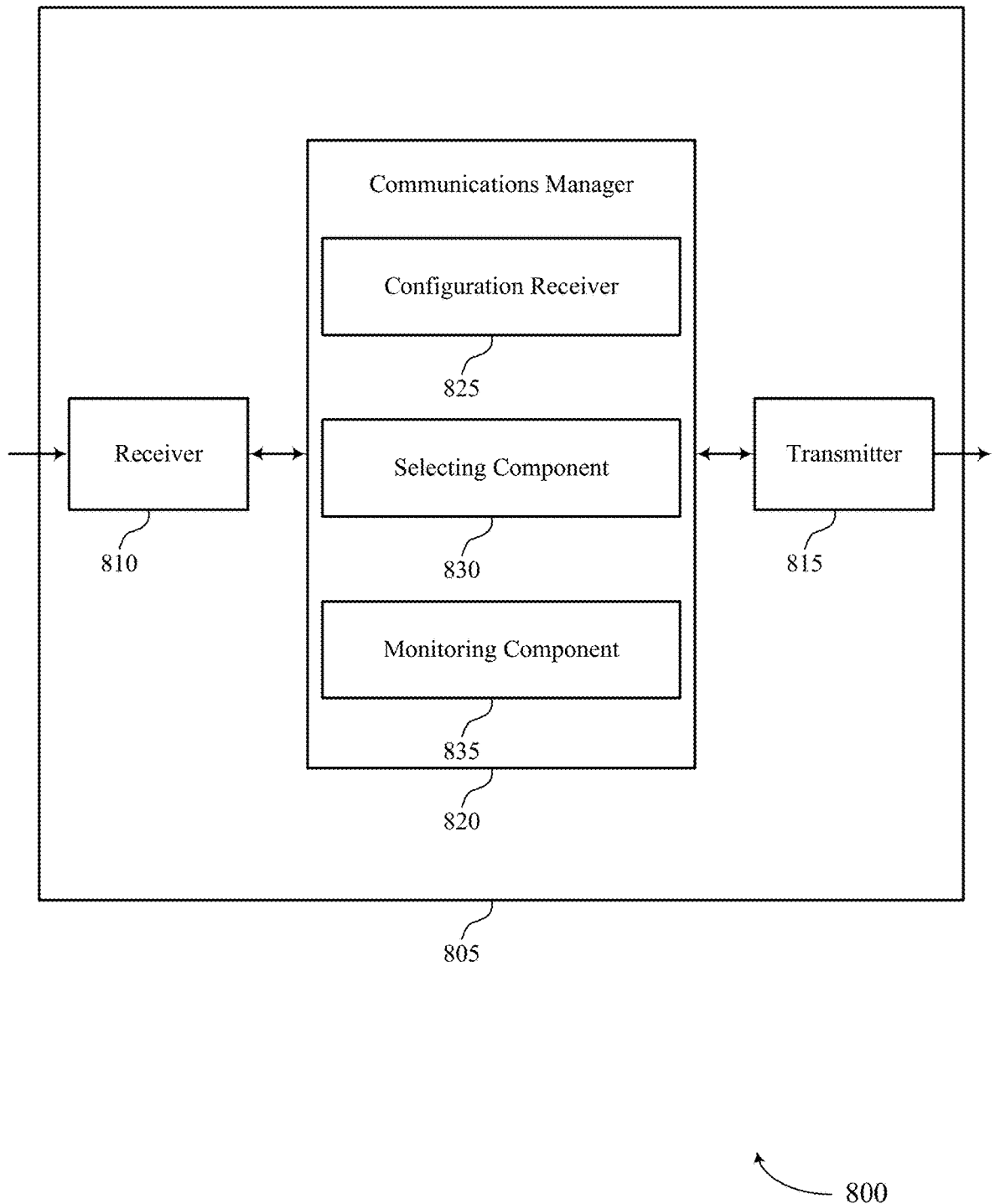

FIG. 8 shows a block diagram 800 of a device 805 that supports RS periodicities for multiple sets of beams in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to RS periodicities for multiple sets of beams). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to RS periodicities for multiple sets of beams). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of RS periodicities for multiple sets of beams as described herein. For example, the communications manager 820 may include a configuration receiver 825, a selecting component 830, a monitoring component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The configuration receiver 825 may be configured as or otherwise support a means for receiving, from a network node, an indication of a configuration for RS measurements. The selecting component 830 may be configured as or otherwise support a means for selecting, based on the configuration, a first set of beams, a first periodicity for measuring RSs on the first set of beams, a second set of beams, and a second periodicity for measuring RSs on the second set of beams, where the second periodicity is different than the first periodicity. The monitoring component 835 may be configured as or otherwise support a means for monitoring a wireless channel for a first set of RSs communicated via the first set of beams according to the first periodicity. The monitoring component 835 may be configured as or otherwise support a means for monitoring the wireless channel for a second set of RSs communicated via the second set of beams according to the second periodicity.

Figure 9:
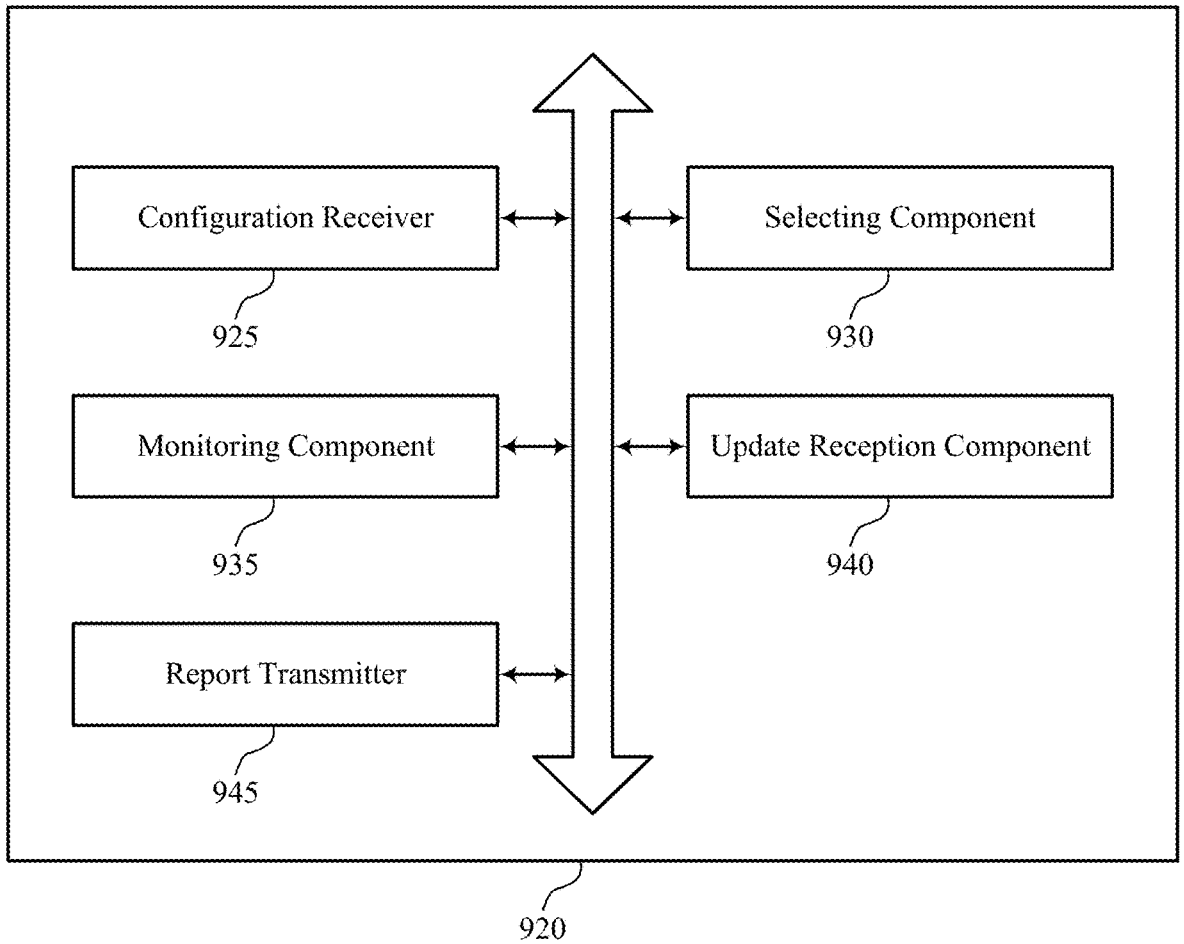
FIG. 9 shows a block diagram of a communications manager that supports RS periodicities for multiple sets of beams in accordance with aspects of the present disclosure.

FIG. 9 shows a block diagram 900 of a communications manager 920 that supports RS periodicities for multiple sets of beams in accordance with aspects of the present disclosure. The communications manager 920 may be an example of aspects of a communications manager 720, a communications manager 820, or both, as described herein. The communications manager 920, or various components thereof, may be an example of means for performing various aspects of RS periodicities for multiple sets of beams as described herein. For example, the communications manager 920 may include a configuration receiver 925, a selecting component 930, a monitoring component 935, an update reception component 940, a report transmitter 945, or any combination thereof. Each of these components may communicate, directly or indirectly, with one another (e.g., via one or more buses).

The communications manager 920 may support wireless communication at a UE in accordance with examples as disclosed herein. The configuration receiver 925 may be configured as or otherwise support a means for receiving, from a network node, an indication of a configuration for RS measurements. The selecting component 930 may be configured as or otherwise support a means for selecting, based on the configuration, a first set of beams, a first periodicity for measuring RSs on the first set of beams, a second set of beams, and a second periodicity for measuring RSs on the second set of beams, where the second periodicity is different than the first periodicity. The monitoring component 935 may be configured as or otherwise support a means for monitoring a wireless channel for a first set of RSs communicated via the first set of beams according to the first periodicity. In some examples, the monitoring component 935 may be configured as or otherwise support a means for monitoring the wireless channel for a second set of RSs communicated via the second set of beams according to the second periodicity.

In some examples, the update reception component 940 may be configured as or otherwise support a means for receiving a control message indicating an update to the configuration for RS measurements. In some examples, the monitoring component 935 may be configured as or otherwise support a means for monitoring the wireless channel for the first set of RSs and the second set of RSs according to the updated configuration for RS measurements.

In some examples, the report transmitter 945 may be configured as or otherwise support a means for transmitting a measurement report to the network node based on monitoring for the first set of RSs and monitoring for the second set of RSs, where receiving the control message indicating the update is based on transmitting the measurement report. In some examples, the measurement report indicates a subset of beams having a highest communication quality across the first set of beams and the second set of beams, the subset of beams including a defined quantity of beams.

In some examples, the update reception component 940 may be configured as or otherwise support a means for receiving the control message indicating to move one or more beams from the first set of beams to the second set of beams, move one or more beams from the second set of beams to the first set of beams, or any combination thereof. In some examples, the monitoring component 935 may be configured as or otherwise support a means for monitoring the wireless channel for the first set of RSs communicated via the first set of beams according to the updated configuration for RS measurements. In some examples, the monitoring component 935 may be configured as or otherwise support a means for monitoring the wireless channel for the second set of RSs communicated via the second set of beams according to the updated configuration for RS measurements.

In some examples, the update reception component 940 may be configured as or otherwise support a means for receiving the control message indicating an updated value for the first periodicity, an updated value for the second periodicity, or both. In some examples, the monitoring component 935 may be configured as or otherwise support a means for monitoring the wireless channel for the first set of RSs according to the first periodicity based on the updated configuration for RS measurements. In some examples, the monitoring component 935 may be configured as or otherwise support a means for monitoring the wireless channel for the second set of RSs according to the second periodicity based on the updated configuration for RS measurements.

In some examples, the update reception component 940 may be configured as or otherwise support a means for receiving the control message indicating to remove one or more beams from the first set of beams, remove one or more beams from the second set of beams, or both. In some examples, the monitoring component 935 may be configured as or otherwise support a means for monitoring the wireless channel for the first set of RSs communicated via the first set of beams according to the updated configuration for RS measurements. In some examples, the monitoring component 935 may be configured as or otherwise support a means for monitoring the wireless channel for the second set of RSs communicated via the second set of beams according to the updated configuration for RS measurements.

In some examples, the update reception component 940 may be configured as or otherwise support a means for receiving the control message indicating to add one or more beams to the first set of beams, add one or more beams to the second set of beams, or both. In some examples, the monitoring component 935 may be configured as or otherwise support a means for monitoring the wireless channel for the first set of RSs communicated via the first set of beams according to the updated configuration for RS measurements. In some examples, the monitoring component 935 may be configured as or otherwise support a means for monitoring the wireless channel for the second set of RSs communicated via the second set of beams according to the updated configuration for RS measurements.

In some examples, the configuration for RS measurements configures the UE to monitor for the first set of RSs and the second set of RSs within a same time window. In some examples, monitoring for the first set of RSs at least partially overlaps with monitoring for the second set of RSs. In some examples, the first periodicity and the second periodicity each include a respective periodicity stored at the UE.

In some examples, the configuration for RS measurements is indicative of one or more parameters for selecting a third set of beams and a third periodicity for measuring RSs on the third set of beams. In some examples, the third periodicity is different from the first periodicity and the second periodicity.

Figure 10:
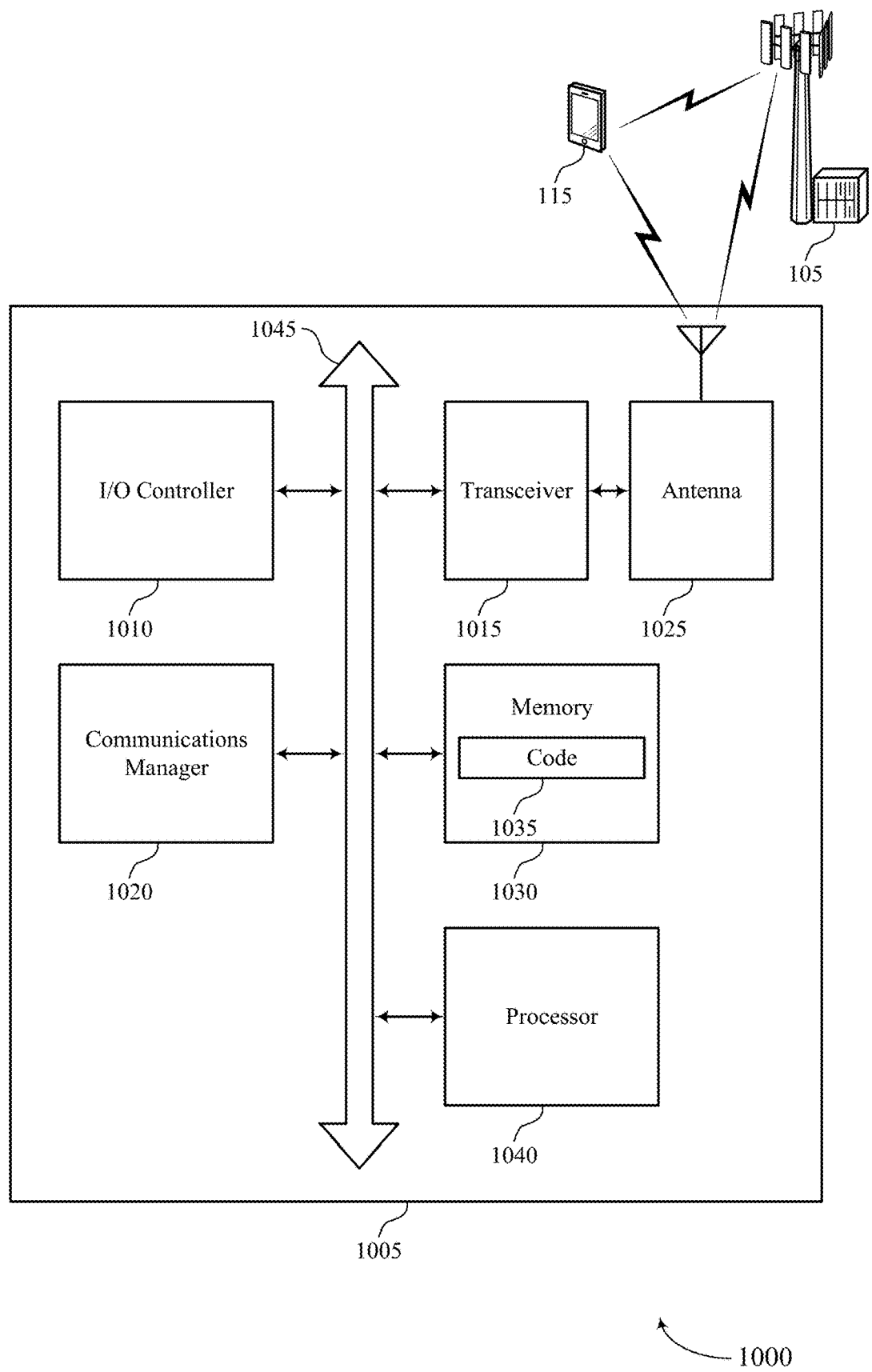
FIG. 10 shows a diagram of a system including a device that supports RS periodicities for multiple sets of beams in accordance with aspects of the present disclosure.

FIG. 10 shows a diagram of a system 1000 including a device 1005 that supports RS periodicities for multiple sets of beams in accordance with aspects of the present disclosure. The device 1005 may be an example of or include the components of a device 705, a device 805, or a UE 115 as described herein. The device 1005 may communicate wirelessly with one or more base stations 105 (e.g., network nodes), UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting RS periodicities for multiple sets of beams). For example, the device 1005 or a component of the device 1005 may include a processor 1040 and memory 1030 coupled with or to the processor 1040, the processor 1040 and memory 1030 configured to perform various functions described herein.

Additionally or alternatively, the communications manager 1020 may support wireless communication at a UE in accordance with examples as disclosed herein. For example, the communications manager 1020 may be configured as or otherwise support a means for receiving, from a network node, an indication of a configuration for RS measurements. The communications manager 1020 may be configured as or otherwise support a means for selecting, based on the configuration, a first set of beams, a first periodicity for measuring RSs on the first set of beams, a second set of beams, and a second periodicity for measuring RSs on the second set of beams, where the second periodicity is different than the first periodicity. The communications manager 1020 may be configured as or otherwise support a means for monitoring a wireless channel for a first set of RSs communicated via the first set of beams according to the first periodicity. The communications manager 1020 may be configured as or otherwise support a means for monitoring the wireless channel for a second set of RSs communicated via the second set of beams according to the second periodicity.

By including or configuring the communications manager 1020 in accordance with examples as described herein, the device 1005 may support techniques for improved communication reliability, reduced latency, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of RS periodicities for multiple sets of beams as described herein, or the processor 1040 and the memory 1030 may be otherwise configured to perform or support such operations.

Figure 11:
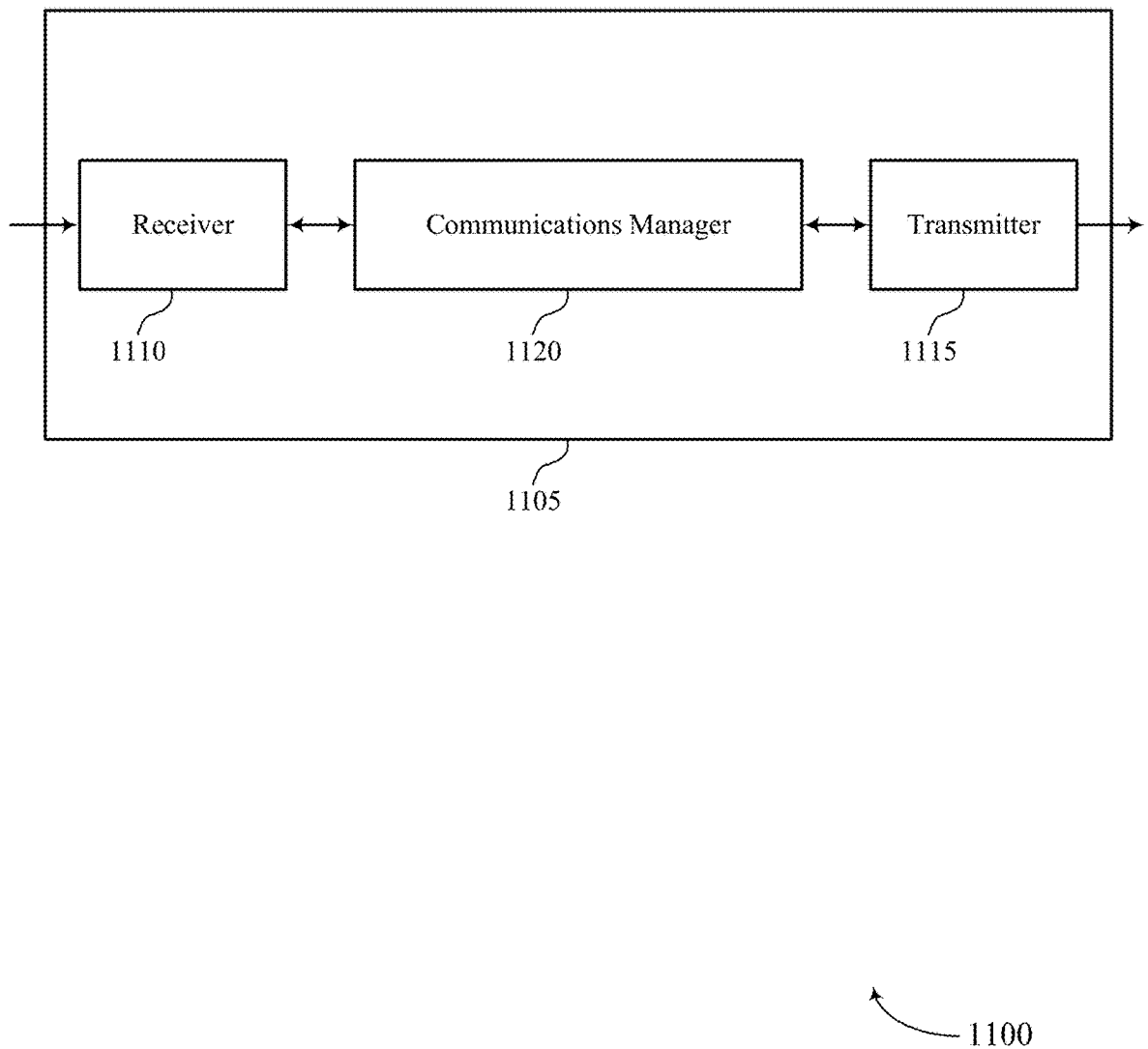
FIGS. 11 and 12 show block diagrams of devices that support RS periodicities for multiple sets of beams in accordance with aspects of the present disclosure.

FIG. 11 shows a block diagram 1100 of a device 1105 that supports RS periodicities for multiple sets of beams in accordance with aspects of the present disclosure. The device 1105 may be an example of aspects of a base station 105 (e.g., network node) as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to RS periodicities for multiple sets of beams). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to RS periodicities for multiple sets of beams). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of RS periodicities for multiple sets of beams as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

Additionally or alternatively, the communications manager 1120 may support wireless communication at a base station (e.g., network node) in accordance with examples as disclosed herein. For example, the communications manager 1120 may be configured as or otherwise support a means for transmitting, to a UE, an indication of a configuration for RS measurements, the configuration indicative of one or more parameters for selecting a first set of beams, a first periodicity for measuring RSs on the first set of beams, a second set of beams, and a second periodicity for measuring RSs on the second set of beams, where the second periodicity is different than the first periodicity. The communications manager 1120 may be configured as or otherwise support a means for transmitting a first set of RSs over a wireless channel via the first set of beams and according to the first periodicity. The communications manager 1120 may be configured as or otherwise support a means for transmitting a second set of RSs over the wireless channel via the second set of beams and according to the second periodicity.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of communication resources.

Figure 12:
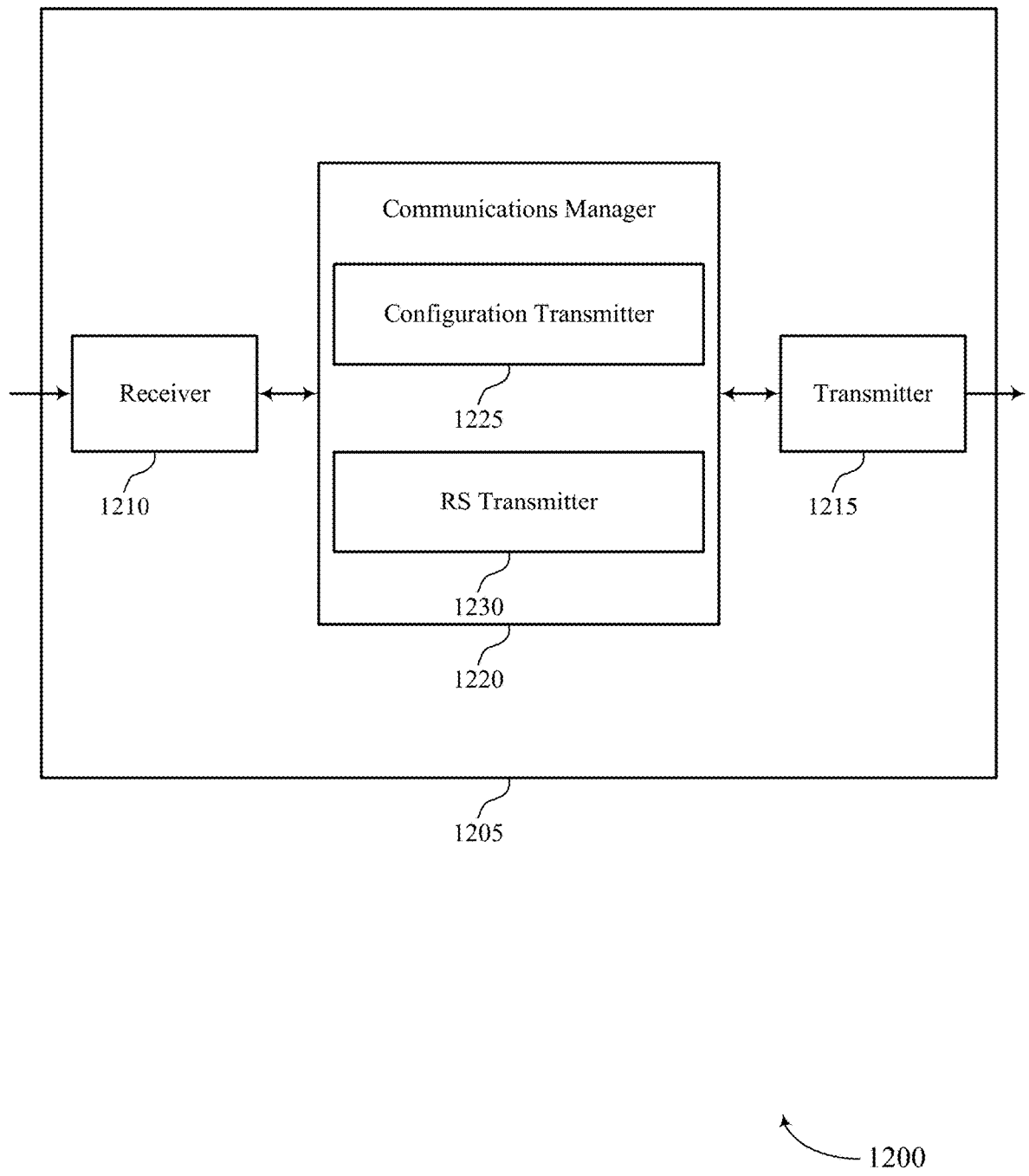

FIG. 12 shows a block diagram 1200 of a device 1205 that supports RS periodicities for multiple sets of beams in accordance with aspects of the present disclosure. The device 1205 may be an example of aspects of a device 1105 or a base station 105 (e.g., network node) as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to RS periodicities for multiple sets of beams). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to RS periodicities for multiple sets of beams). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of RS periodicities for multiple sets of beams as described herein. For example, the communications manager 1220 may include a configuration transmitter 1225 an RS transmitter 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station (e.g., network node) in accordance with examples as disclosed herein. The configuration transmitter 1225 may be configured as or otherwise support a means for transmitting, to a UE, an indication of a configuration for RS measurements, the configuration indicative of one or more parameters for selecting a first set of beams, a first periodicity for measuring RSs on the first set of beams, a second set of beams, and a second periodicity for measuring RSs on the second set of beams, where the second periodicity is different than the first periodicity. The RS transmitter 1230 may be configured as or otherwise support a means for transmitting a first set of RSs over a wireless channel via the first set of beams and according to the first periodicity. The RS transmitter 1230 may be configured as or otherwise support a means for transmitting a second set of RSs over the wireless channel via the second set of beams and according to the second periodicity.

Figure 13:
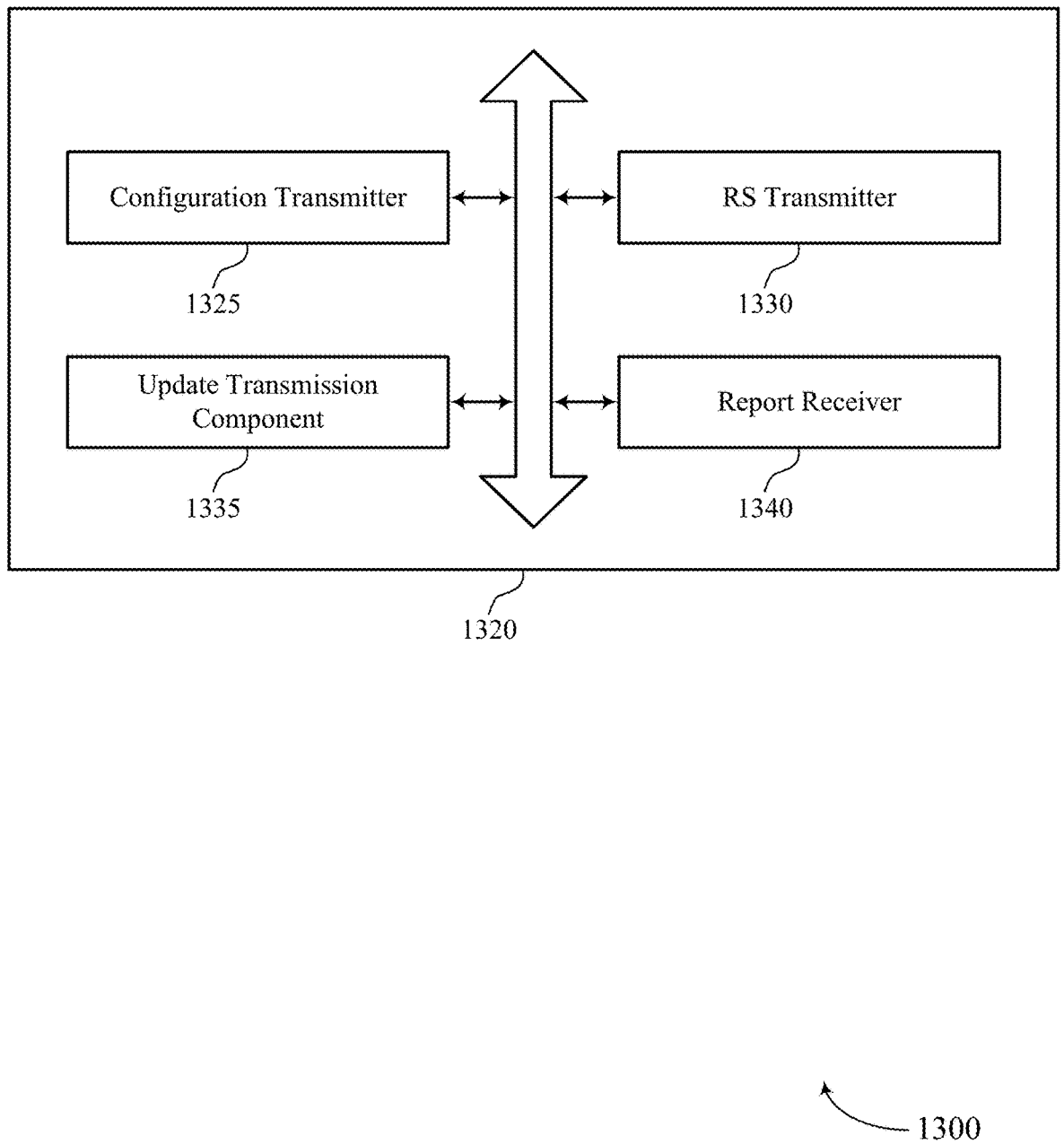
FIG. 13 shows a block diagram of a communications manager that supports RS periodicities for multiple sets of beams in accordance with aspects of the present disclosure.

FIG. 13 shows a block diagram 1300 of a communications manager 1320 that supports RS periodicities for multiple sets of beams in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of RS periodicities for multiple sets of beams as described herein. For example, the communications manager 1320 may include a configuration transmitter 1325, an RS transmitter 1330, an update transmission component 1335, a report receiver 1340, or any combination thereof. Each of these components may communicate, directly or indirectly, with one another (e.g., via one or more buses).

The communications manager 1320 may support wireless communication at a base station (e.g., network node) in accordance with examples as disclosed herein. The configuration transmitter 1325 may be configured as or otherwise support a means for transmitting, to a UE, an indication of a configuration for RS measurements, the configuration indicative of one or more parameters for selecting a first set of beams, a first periodicity for measuring RSs on the first set of beams, a second set of beams, and a second periodicity for measuring RSs on the second set of beams, where the second periodicity is different than the first periodicity. The RS transmitter 1330 may be configured as or otherwise support a means for transmitting a first set of RSs over a wireless channel via the first set of beams and according to the first periodicity. In some examples, the RS transmitter 1330 may be configured as or otherwise support a means for transmitting a second set of RSs over the wireless channel via the second set of beams and according to the second periodicity.

In some examples, the update transmission component 1335 may be configured as or otherwise support a means for transmitting a control message indicating an update to the configuration for RS measurements. In some examples, the RS transmitter 1330 may be configured as or otherwise support a means for transmitting the first set of RSs and the second set of RSs over the wireless channel according to the updated configuration for RS measurements.

In some examples, the report receiver 1340 may be configured as or otherwise support a means for receiving a measurement report from the UE based on transmitting the first set of RSs and the second set of RSs, where transmitting the control message indicating the update is based on receiving the measurement report. In some examples, the measurement report indicates a subset of beams having a highest communication quality across the first set of beams and the second set of beams, the subset of beams including a defined quantity of beams.

In some examples, the update transmission component 1335 may be configured as or otherwise support a means for identifying a change to make to the first set of beams, the second set of beams, or both using a machine learning algorithm, where transmitting the control message indicating the update to the configuration for RS measurements is based on identifying the change.

In some examples, the update transmission component 1335 may be configured as or otherwise support a means for transmitting the control message indicating to move one or more beams from the first set of beams to the second set of beams, move one or more beams from the second set of beams to the first set of beams, or any combination thereof. In some examples, the RS transmitter 1330 may be configured as or otherwise support a means for transmitting the first set of RSs over the wireless channel via the first set of beams and according to the updated configuration for RS measurements. In some examples, the RS transmitter 1330 may be configured as or otherwise support a means for transmitting the second set of RSs over the wireless channel via the second set of beams and according to the updated configuration for RS measurements.

In some examples, the update transmission component 1335 may be configured as or otherwise support a means for transmitting the control message indicating an updated value for the first periodicity, an updated value for the second periodicity, or both. In some examples, the RS transmitter 1330 may be configured as or otherwise support a means for transmitting the first set of RSs over the wireless channel according to the first periodicity based on the updated configuration for RS measurements. In some examples, the RS transmitter 1330 may be configured as or otherwise support a means for transmitting the second set of RSs over the wireless channel according to the second periodicity based on the updated configuration for RS measurements.

In some examples, the update transmission component 1335 may be configured as or otherwise support a means for transmitting the control message indicating to remove one or more beams from the first set of beams, remove one or more beams from the second set of beams, or both. In some examples, the RS transmitter 1330 may be configured as or otherwise support a means for transmitting the first set of RSs over the wireless channel via the first set of beams and according to the updated configuration for RS measurements. In some examples, the RS transmitter 1330 may be configured as or otherwise support a means for transmitting the second set of RSs over the wireless channel via the second set of beams and according to the updated configuration for RS measurements.

In some examples, the update transmission component 1335 may be configured as or otherwise support a means for transmitting the control message indicating to add one or more beams to the first set of beams, add one or more beams to the second set of beams, or both. In some examples, the RS transmitter 1330 may be configured as or otherwise support a means for transmitting the first set of RSs over the wireless channel via the first set of beams and according to the updated configuration for RS measurements. In some examples, the RS transmitter 1330 may be configured as or otherwise support a means for transmitting the second set of RSs over the wireless channel via the second set of beams and according to the updated configuration for RS measurements.

In some examples, the configuration for RS measurements configures the UE to monitor for the first set of RSs and the second set of RSs within a same time window. In some examples, transmitting the first set of RSs at least partially overlaps with transmitting the second set of RSs. In some examples, the first periodicity and the second periodicity each include a respective periodicity stored at the network node.

In some examples, the configuration for RS measurements is indicative of one or more additional parameters for selecting a third set of beams and a third periodicity for measuring RSs on the third set of beams. In some examples, the third periodicity is different from the first periodicity and the second periodicity.

Figure 14:
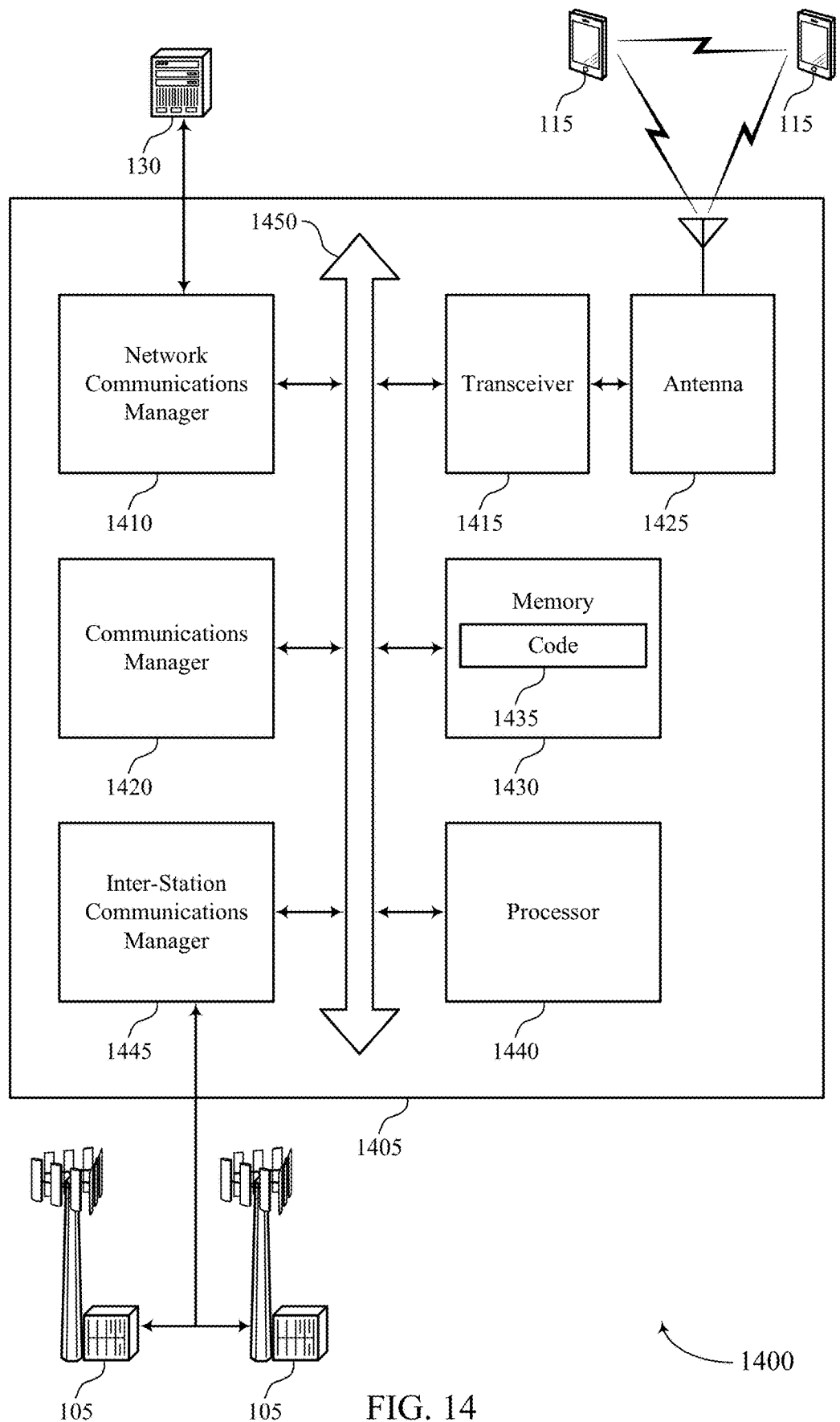
FIG. 14 shows a diagram of a system including a device that supports RS periodicities for multiple sets of beams in accordance with aspects of the present disclosure.

FIG. 14 shows a diagram of a system 1400 including a device 1405 that supports RS periodicities for multiple sets of beams in accordance with aspects of the present disclosure. The device 1405 may be an example of or include the components of a device 1105, a device 1205, or a base station 105 (e.g., network node) as described herein. The device 1405 may communicate wirelessly with one or more base stations 105 (e.g., network nodes), UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting RS periodicities for multiple sets of beams). For example, the device 1405 or a component of the device 1405 may include a processor 1440 and memory 1430 coupled with or to the processor 1440, the processor 1440 and memory 1430 configured to perform various functions described herein.

The inter-station communications manager 1445 may manage communications with other base stations 105 (e.g., network nodes), and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105 (e.g., network nodes).

Additionally or alternatively, the communications manager 1420 may support wireless communication at a base station (e.g., network node) in accordance with examples as disclosed herein. For example, the communications manager 1420 may be configured as or otherwise support a means for transmitting, to a UE, an indication of a configuration for RS measurements, the configuration indicative of one or more parameters for selecting a first set of beams, a first periodicity for measuring RSs on the first set of beams, a second set of beams, and a second periodicity for measuring RSs on the second set of beams, where the second periodicity is different than the first periodicity. The communications manager 1420 may be configured as or otherwise support a means for transmitting a first set of RSs over a wireless channel via the first set of beams and according to the first periodicity. The communications manager 1420 may be configured as or otherwise support a means for transmitting a second set of RSs over the wireless channel via the second set of beams and according to the second periodicity.

By including or configuring the communications manager 1420 in accordance with examples as described herein, the device 1405 may support techniques for improved communication reliability, more efficient utilization of communication resources, and improved coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of RS periodicities for multiple sets of beams as described herein, or the processor 1440 and the memory 1430 may be otherwise configured to perform or support such operations.

Figure 15:
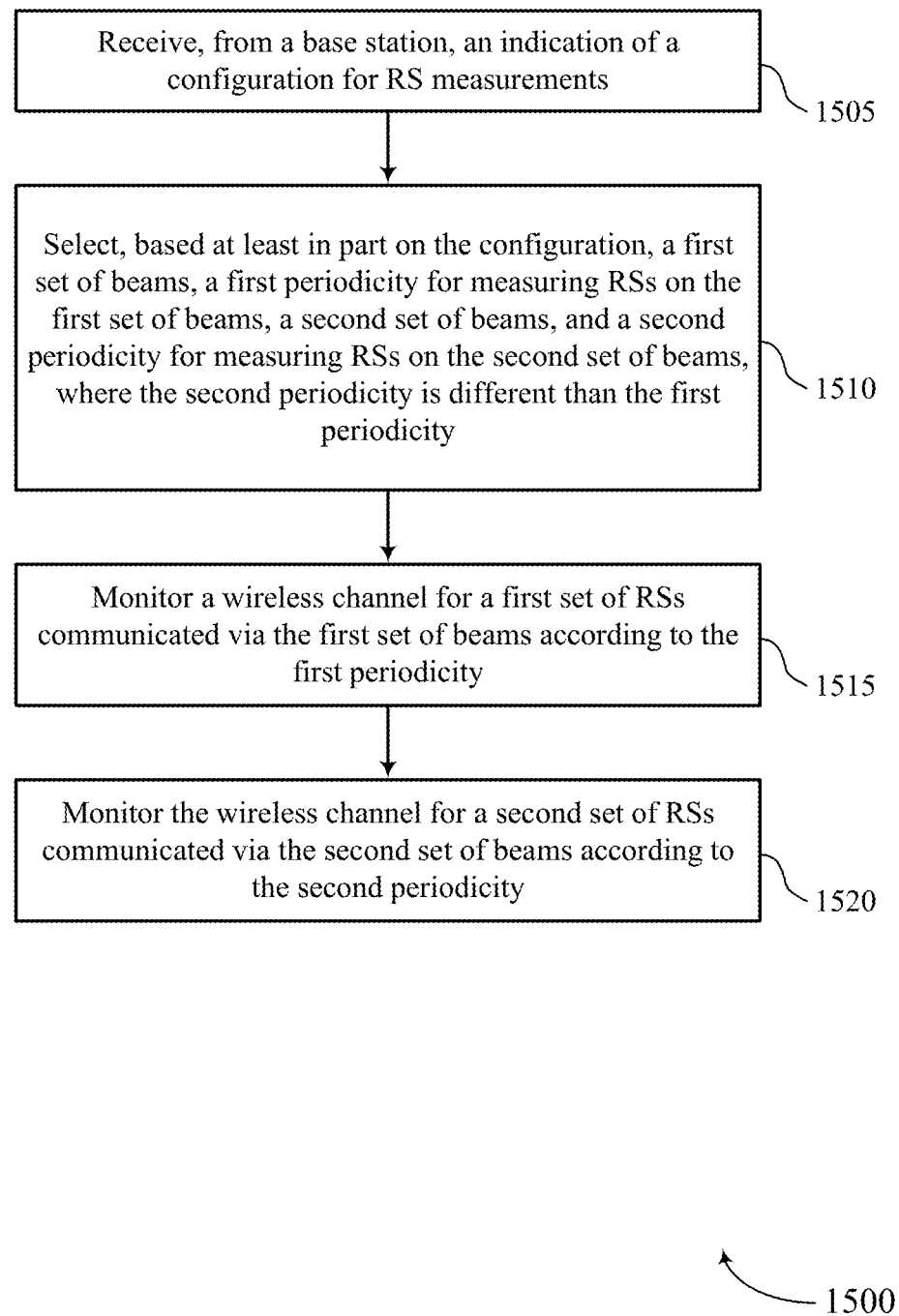
FIGS. 15 through 18 show flowcharts illustrating methods that support RS periodicities for multiple sets of beams in accordance with aspects of the present disclosure.

FIG. 15 shows a flowchart illustrating a method 1500 that supports RS periodicities for multiple sets of beams in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a network node, an indication of a configuration for RS measurements. The operations of 1505 may be performed in accordance with examples as disclosed herein. In some examples, aspects of the operations of 1505 may be performed by a configuration receiver 925 as described with reference to FIG. 9.

At 1510, the method may include selecting, based on the configuration, a first set of beams, a first periodicity for measuring RSs on the first set of beams, a second set of beams, and a second periodicity for measuring RSs on the second set of beams, where the second periodicity is different than the first periodicity. The operations of 1510 may be performed in accordance with examples as disclosed herein. In some examples, aspects of the operations of 1510 may be performed by a selecting component 930 as described with reference to FIG. 9.

At 1515, the method may include monitoring a wireless channel for a first set of RSs communicated via the first set of beams according to the first periodicity. The operations of 1515 may be performed in accordance with examples as disclosed herein. In some examples, aspects of the operations of 1515 may be performed by a monitoring component 935 as described with reference to FIG. 9.

At 1520, the method may include monitoring the wireless channel for a second set of RSs communicated via the second set of beams according to the second periodicity. The operations of 1520 may be performed in accordance with examples as disclosed herein. In some examples, aspects of the operations of 1520 may be performed by a monitoring component 935 as described with reference to FIG. 9.

Figure 16:
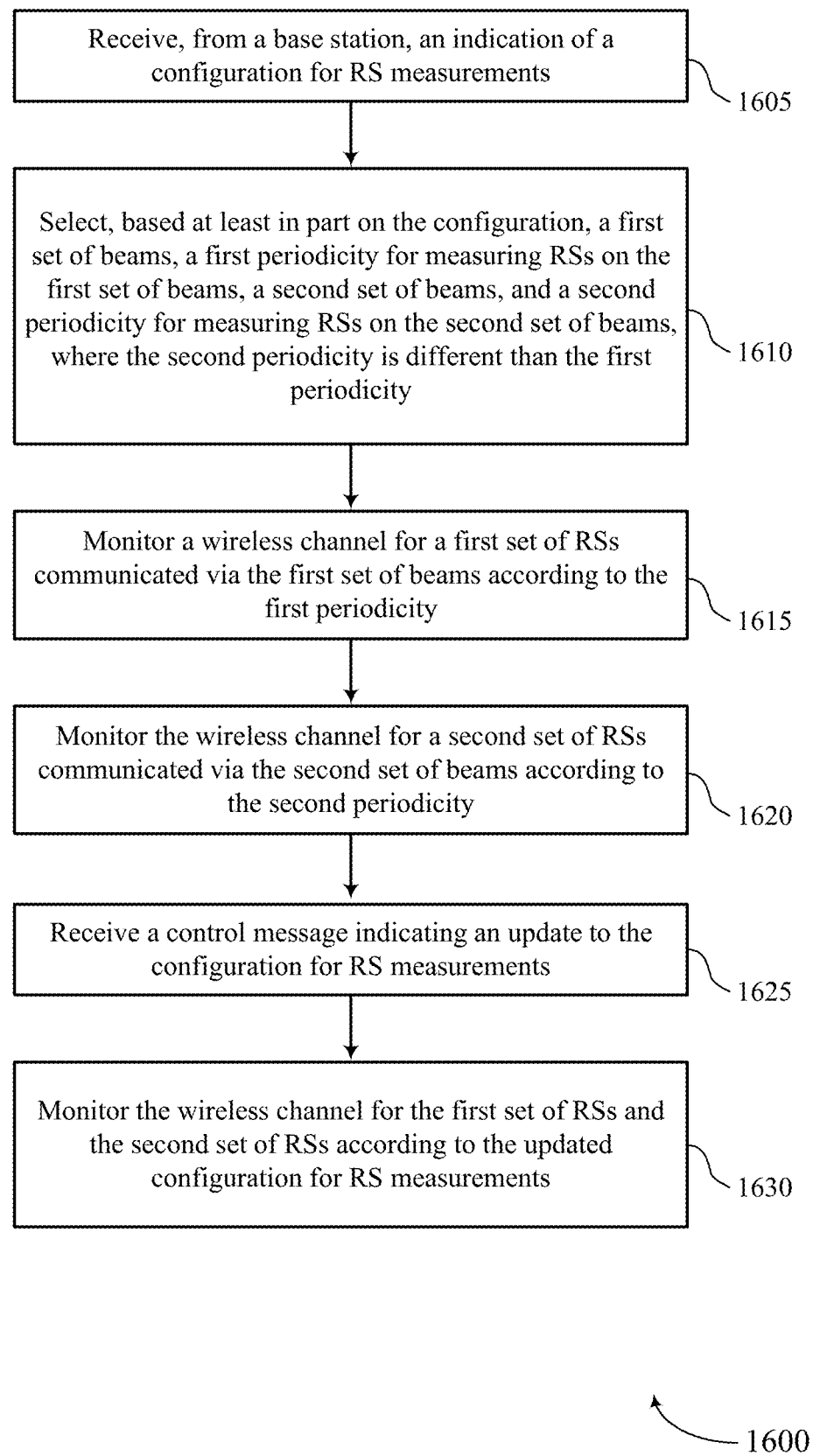

FIG. 16 shows a flowchart illustrating a method 1600 that supports RS periodicities for multiple sets of beams in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a network node, an indication of a configuration for RS measurements. The operations of 1605 may be performed in accordance with examples as disclosed herein. In some examples, aspects of the operations of 1605 may be performed by a configuration receiver 925 as described with reference to FIG. 9.

At 1610, the method may include selecting, based on the configuration, a first set of beams, a first periodicity for measuring RSs on the first set of beams, a second set of beams, and a second periodicity for measuring RSs on the second set of beams, where the second periodicity is different than the first periodicity. The operations of 1610 may be performed in accordance with examples as disclosed herein. In some examples, aspects of the operations of 1610 may be performed by a selecting component 930 as described with reference to FIG. 9.

At 1615, the method may include monitoring a wireless channel for a first set of RSs communicated via the first set of beams according to the first periodicity. The operations of 1615 may be performed in accordance with examples as disclosed herein. In some examples, aspects of the operations of 1615 may be performed by a monitoring component 935 as described with reference to FIG. 9.

At 1620, the method may include monitoring the wireless channel for a second set of RSs communicated via the second set of beams according to the second periodicity. The operations of 1620 may be performed in accordance with examples as disclosed herein. In some examples, aspects of the operations of 1620 may be performed by a monitoring component 935 as described with reference to FIG. 9.

At 1625, the method may include receiving a control message indicating an update to the configuration for RS measurements. The operations of 1630 may be performed in accordance with examples as disclosed herein. In some examples, aspects of the operations of 1630 may be performed by an update reception component 940 as described with reference to FIG. 9.

At 1630, the method may include monitoring the wireless channel for the first set of RSs and the second set of RSs according to the updated configuration for RS measurements. The operations of 1635 may be performed in accordance with examples as disclosed herein. In some examples, aspects of the operations of 1635 may be performed by a monitoring component 935 as described with reference to FIG. 9.

Figure 17:
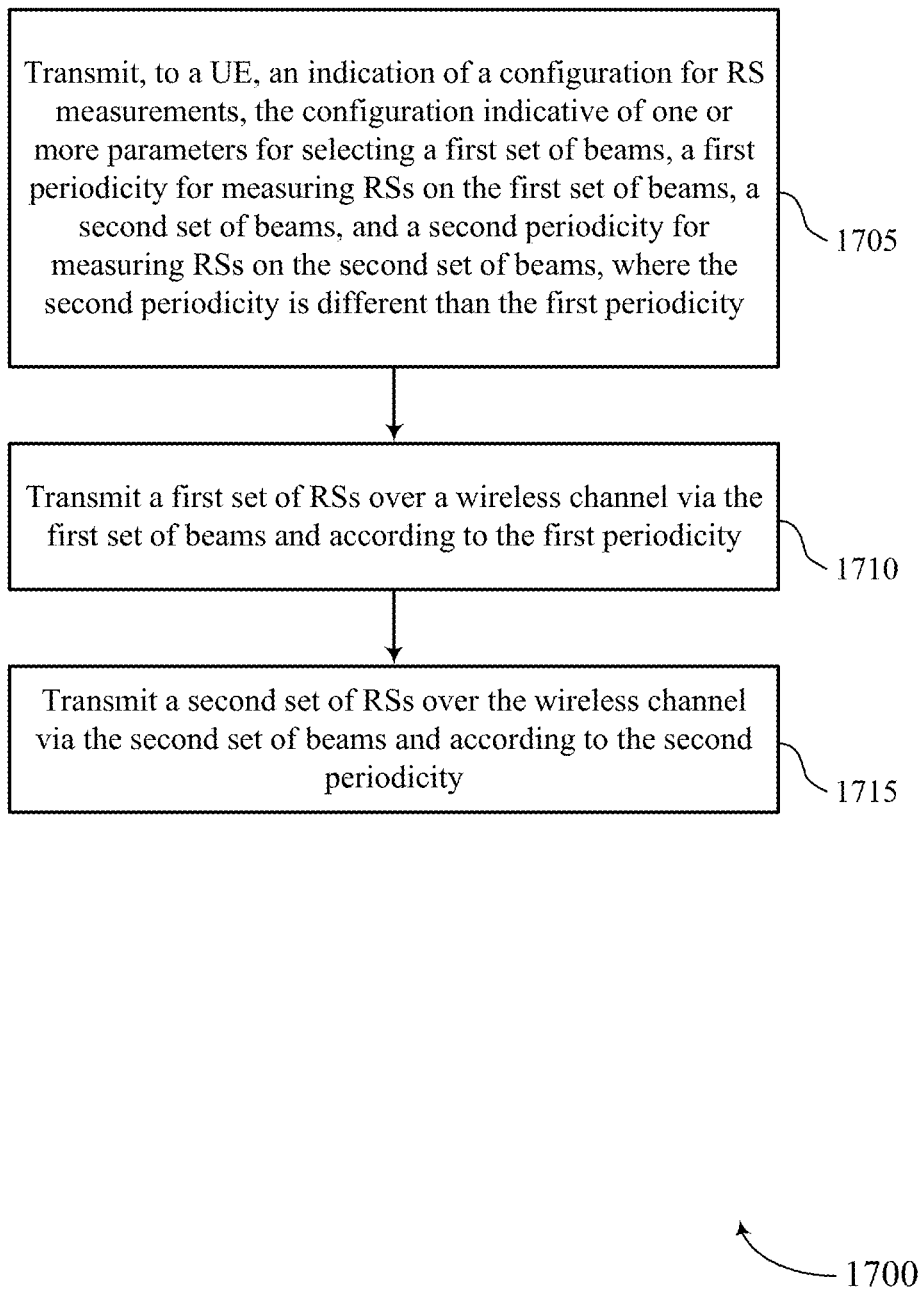

FIG. 17 shows a flowchart illustrating a method 1700 that supports RS periodicities for multiple sets of beams in accordance with aspects of the present disclosure. The operations of the method 1700 may be implemented by a base station (e.g., network node) or its components as described herein. For example, the operations of the method 1700 may be performed by a base station 105 (e.g., network node) as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, an indication of a configuration for RS measurements, the configuration indicative of one or more parameters for selecting a first set of beams, a first periodicity for measuring RSs on the first set of beams, a second set of beams, and a second periodicity for measuring RSs on the second set of beams, where the second periodicity is different than the first periodicity. The operations of 1705 may be performed in accordance with examples as disclosed herein. In some examples, aspects of the operations of 1705 may be performed by a configuration transmitter 1325 as described with reference to FIG. 13.

At 1710, the method may include transmitting a first set of RSs over a wireless channel via the first set of beams and according to the first periodicity. The operations of 1710 may be performed in accordance with examples as disclosed herein. In some examples, aspects of the operations of 1710 may be performed by an RS transmitter 1330 as described with reference to FIG. 13.

At 1715, the method may include transmitting a second set of RSs over the wireless channel via the second set of beams and according to the second periodicity. The operations of 1715 may be performed in accordance with examples as disclosed herein. In some examples, aspects of the operations of 1715 may be performed by an RS transmitter 1330 as described with reference to FIG. 13.

Figure 18:
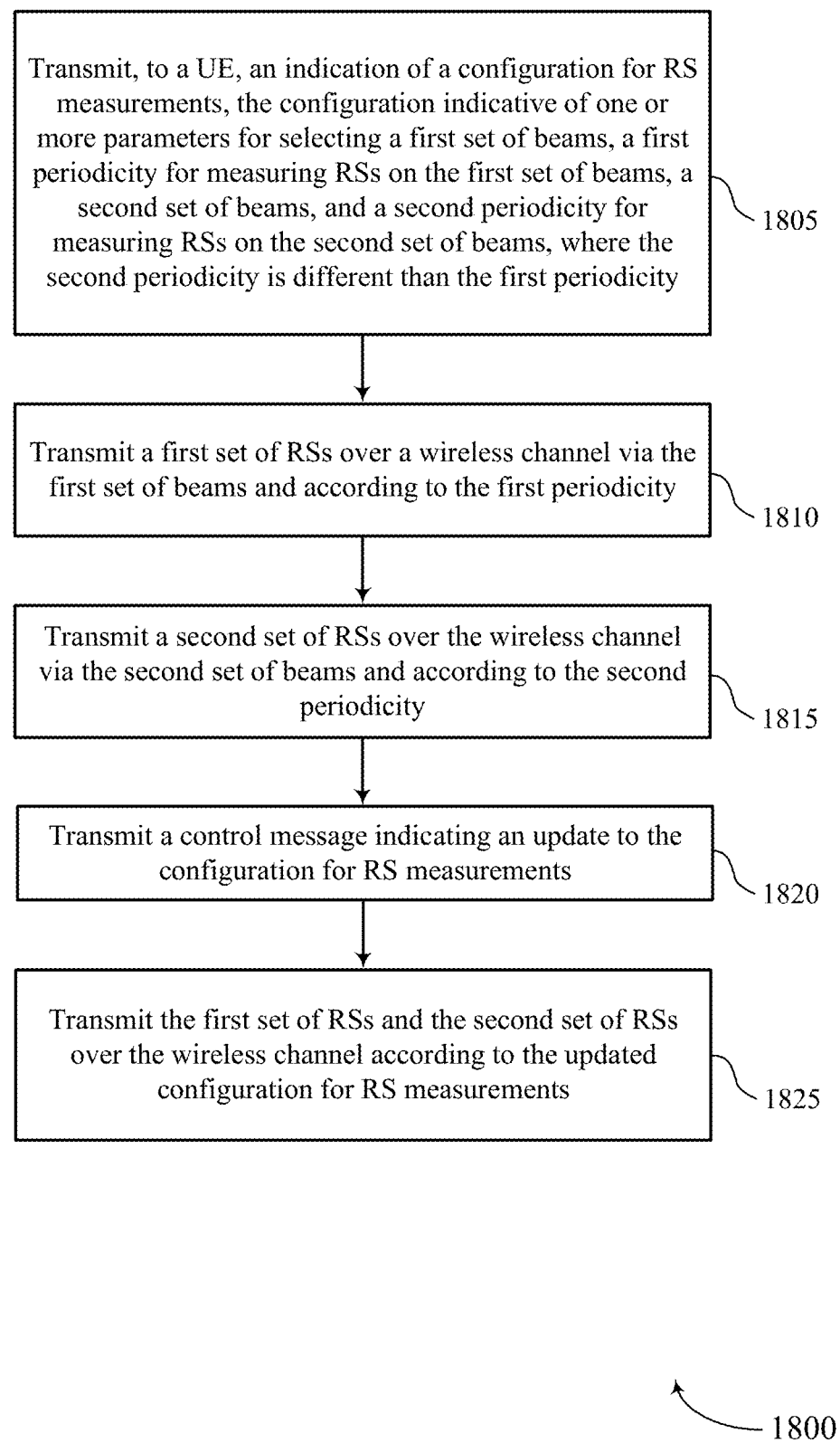

FIG. 18 shows a flowchart illustrating a method 1800 that supports RS periodicities for multiple sets of beams in accordance with aspects of the present disclosure. The operations of the method 1800 may be implemented by a base station (e.g., network node) or its components as described herein. For example, the operations of the method 1800 may be performed by a base station 105 (e.g., network node) as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, an indication of a configuration for RS measurements, the configuration indicative of one or more parameters for selecting a first set of beams, a first periodicity for measuring RSs on the first set of beams, a second set of beams, and a second periodicity for measuring RSs on the second set of beams, where the second periodicity is different than the first periodicity. The operations of 1805 may be performed in accordance with examples as disclosed herein. In some examples, aspects of the operations of 1805 may be performed by a configuration transmitter 1325 as described with reference to FIG. 13.

At 1810, the method may include transmitting a first set of RSs over a wireless channel via the first set of beams and according to the first periodicity. The operations of 1810 may be performed in accordance with examples as disclosed herein. In some examples, aspects of the operations of 1810 may be performed by an RS transmitter 1330 as described with reference to FIG. 13.

At 1815, the method may include transmitting a second set of RSs over the wireless channel via the second set of beams and according to the second periodicity. The operations of 1815 may be performed in accordance with examples as disclosed herein. In some examples, aspects of the operations of 1815 may be performed by an RS transmitter 1330 as described with reference to FIG. 13.

At 1820, the method may include transmitting a control message indicating an update to the configuration for RS measurements. The operations of 1825 may be performed in accordance with examples as disclosed herein. In some examples, aspects of the operations of 1825 may be performed by an update transmission component 1335 as described with reference to FIG. 13.

At 1825, the method may include transmitting the first set of RSs and the second set of RSs over the wireless channel according to the updated configuration for RS measurements. The operations of 1830 may be performed in accordance with examples as disclosed herein. In some examples, aspects of the operations of 1830 may be performed by an RS transmitter 1330 as described with reference to FIG. 13.

The following provides an overview of aspects of the present disclosure:

Aspect 1: A method for wireless communication at a UE, comprising: receiving, from a network node, an indication of a configuration for RS measurements; selecting, based at least in part on the configuration, a first set of beams, a first periodicity for measuring RSs on the first set of beams, a second set of beams, and a second periodicity for measuring RSs on the second set of beams, wherein the second periodicity is different than the first periodicity; monitoring a wireless channel for a first set of RSs communicated via the first set of beams according to the first periodicity; and monitoring the wireless channel for a second set of RSs communicated via the second set of beams according to the second periodicity.

Aspect 2: The method of aspect 1, further comprising: receiving a control message indicating an update to the configuration for RS measurements; and monitoring the wireless channel for the first set of RSs and the second set of RSs according to the updated configuration for RS measurements.

Aspect 3: The method of aspect 2, further comprising: transmitting a measurement report to the network node based at least in part on monitoring for the first set of RSs and monitoring for the second set of RSs, wherein receiving the control message indicating the update is based at least in part on transmitting the measurement report.

Aspect 4: The method of aspect 3, wherein the measurement report indicates a subset of beams having a highest communication quality across the first set of beams and the second set of beams, the subset of beams comprising a defined quantity of beams.

Aspect 5: The method of any of aspects 2 through 4, further comprising: receiving the control message indicating to move one or more beams from the first set of beams to the second set of beams, move one or more beams from the second set of beams to the first set of beams, or any combination thereof; monitoring the wireless channel for the first set of RSs communicated via the first set of beams according to the updated configuration for RS measurements; and monitoring the wireless channel for the second set of RSs communicated via the second set of beams according to the updated configuration for RS measurements.

Aspect 6: The method of any of aspects 2 through 5, further comprising: receiving the control message indicating an updated value for the first periodicity, an updated value for the second periodicity, or both; monitoring the wireless channel for the first set of RSs according to the first periodicity based at least in part on the updated configuration for RS measurements; and monitoring the wireless channel for the second set of RSs according to the second periodicity based at least in part on the updated configuration for RS measurements.

Aspect 7: The method of any of aspects 2 through 6, further comprising: receiving the control message indicating to remove one or more beams from the first set of beams, remove one or more beams from the second set of beams, or both; monitoring the wireless channel for the first set of RSs communicated via the first set of beams according to the updated configuration for RS measurements; and monitoring the wireless channel for the second set of RSs communicated via the second set of beams according to the updated configuration for RS measurements.

Aspect 8: The method of any of aspects 2 through 7, further comprising: receiving the control message indicating to add one or more beams to the first set of beams, add one or more beams to the second set of beams, or both; monitoring the wireless channel for the first set of RSs communicated via the first set of beams according to the updated configuration for RS measurements; and monitoring the wireless channel for the second set of RSs communicated via the second set of beams according to the updated configuration for RS measurements.

Aspect 9: The method of any of aspects 1 through 8, wherein the configuration for RS measurements configures the UE to monitor for the first set of RSs and the second set of RSs within a same time window.

Aspect 10: The method of any of aspects 1 through 9, wherein monitoring for the first set of RSs at least partially overlaps with monitoring for the second set of RSs.

Aspect 11: The method of any of aspects 1 through 10, wherein the first periodicity and the second periodicity each comprise a respective periodicity stored at the UE.

Aspect 12: The method of any of aspects 1 through 11, wherein the configuration for RS measurements is indicative of one or more parameters for selecting a third set of beams and a third periodicity for measuring RSs on the third set of beams, the third periodicity is different from the first periodicity and the second periodicity.

Aspect 13: A method for wireless communication at a network node, comprising: transmitting, to a UE, an indication of a configuration for RS measurements, the configuration indicative of one or more parameters for selecting a first set of beams, a first periodicity for measuring RSs on the first set of beams, a second set of beams, and a second periodicity for measuring RSs on the second set of beams, wherein the second periodicity is different than the first periodicity; transmitting a first set of RSs over a wireless channel via the first set of beams and according to the first periodicity; and transmitting a second set of RSs over the wireless channel via the second set of beams and according to the second periodicity.

Aspect 14: The method of aspect 13, further comprising: transmitting a control message indicating an update to the configuration for RS measurements; and transmitting the first set of RSs and the second set of RSs over the wireless channel according to the updated configuration for RS measurements.

Aspect 15: The method of aspect 14, further comprising: receiving a measurement report from the UE based at least in part on transmitting the first set of RSs and the second set of RSs, wherein transmitting the control message indicating the update is based at least in part on receiving the measurement report.

Aspect 16: The method of aspect 15, wherein the measurement report indicates a subset of beams having a highest communication quality across the first set of beams and the second set of beams, the subset of beams comprising a defined quantity of beams.

Aspect 17: The method of any of aspects 14 through 16, further comprising: identifying a change to make to the first set of beams, the second set of beams, or both using a machine learning algorithm, wherein transmitting the control message indicating the update to the configuration for RS measurements is based at least in part on identifying the change.

Aspect 18: The method of any of aspects 14 through 17, further comprising: transmitting the control message indicating to move one or more beams from the first set of beams to the second set of beams, move one or more beams from the second set of beams to the first set of beams, or any combination thereof; transmitting the first set of RSs over the wireless channel via the first set of beams and according to the updated configuration for RS measurements; and transmitting the second set of RSs over the wireless channel via the second set of beams and according to the updated configuration for RS measurements.

Aspect 19: The method of any of aspects 14 through 18, further comprising: transmitting the control message indicating an updated value for the first periodicity, an updated value for the second periodicity, or both; transmitting the first set of RSs over the wireless channel according to the first periodicity based at least in part on the updated configuration for RS measurements; and transmitting the second set of RSs over the wireless channel according to the second periodicity based at least in part on the updated configuration for RS measurements.

Aspect 20: The method of any of aspects 14 through 19, further comprising: transmitting the control message indicating to remove one or more beams from the first set of beams, remove one or more beams from the second set of beams, or both; transmitting the first set of RSs over the wireless channel via the first set of beams and according to the updated configuration for RS measurements; and transmitting the second set of RSs over the wireless channel via the second set of beams and according to the updated configuration for RS measurements.

Aspect 21: The method of any of aspects 14 through 20, further comprising: transmitting the control message indicating to add one or more beams to the first set of beams, add one or more beams to the second set of beams, or both; transmitting the first set of RSs over the wireless channel via the first set of beams and according to the updated configuration for RS measurements; and transmitting the second set of RSs over the wireless channel via the second set of beams and according to the updated configuration for RS measurements.

Aspect 22: The method of any of aspects 13 through 21, wherein the configuration for RS measurements configures the UE to monitor for the first set of RSs and the second set of RSs within a same time window.

Aspect 23: The method of any of aspects 13 through 22, wherein transmitting the first set of RSs at least partially overlaps with transmitting the second set of RSs.

Aspect 24: The method of any of aspects 13 through 23, wherein the first periodicity and the second periodicity each comprise a respective periodicity stored at the network node.

Aspect 25: The method of any of aspects 13 through 24, wherein the configuration for RS measurements is indicative of one or more additional parameters for selecting a third set of beams and a third periodicity for measuring RSs on the third set of beams, the third periodicity is different from the first periodicity and the second periodicity.

Aspect 26: An apparatus for wireless communication at a UE, comprising a processor; memory coupled with the processor; and instructions stored in the memory and executable by the processor to cause the apparatus to perform a method of any of aspects 1 through 12.

Aspect 27: An apparatus for wireless communication at a UE, comprising at least one means for performing a method of any of aspects 1 through 12.

Aspect 28: A non-transitory computer-readable medium storing code for wireless communication at a UE, the code comprising instructions executable by a processor to perform a method of any of aspects 1 through 12.

Aspect 29: An apparatus for wireless communication at a network node, comprising a processor; memory coupled with the processor; and instructions stored in the memory and executable by the processor to cause the apparatus to perform a method of any of aspects 13 through 25.

Aspect 30: An apparatus for wireless communication at a network node, comprising at least one means for performing a method of any of aspects 13 through 25.

Aspect 31: A non-transitory computer-readable medium storing code for wireless communication at a network node, the code comprising instructions executable by a processor to perform a method of any of aspects 13 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive, from a network node, an indication of a configuration for reference signal measurements;
select, based at least in part on the configuration, a first set of beams, a first periodicity for measuring reference signals on the first set of beams, a second set of beams, and a second periodicity for measuring reference signals on the second set of beams, wherein the second periodicity is different than the first periodicity;
monitor a wireless channel for a first set of reference signals communicated via the first set of beams according to the first periodicity; and
monitor the wireless channel for a second set of reference signals communicated via the second set of beams according to the second periodicity.

2. The UE of claim 1, wherein the one or more processors are individually or collectively further operable to execute the code to cause the UE to:
receive a control message indicating an update to the configuration for reference signal measurements; and
monitor the wireless channel for the first set of reference signals and the second set of reference signals according to the updated configuration for reference signal measurements.

3. The UE of claim 2, wherein the one or more processors are individually or collectively further operable to execute the code to cause the UE to:
transmit a measurement report to the network node based at least in part on monitoring for the first set of reference signals and monitoring for the second set of reference signals, wherein receiving the control message indicating the update is based at least in part on transmitting the measurement report.

4. The UE of claim 3, wherein the measurement report indicates a subset of beams having a highest communication quality across the first set of beams and the second set of beams, the subset of beams comprising a defined quantity of beams.

5. The UE of claim 2, wherein the one or more processors are individually or collectively further operable to execute the code to cause the UE to:
receive the control message indicating to move one or more beams from the first set of beams to the second set of beams, move one or more beams from the second set of beams to the first set of beams, or any combination thereof;
monitor the wireless channel for the first set of reference signals communicated via the first set of beams according to the updated configuration for reference signal measurements; and
monitor the wireless channel for the second set of reference signals communicated via the second set of beams according to the updated configuration for reference signal measurements.

6. The UE of claim 2, wherein the one or more processors are individually or collectively further operable to execute the code to cause the UE to:
receive the control message indicating an updated value for the first periodicity, an updated value for the second periodicity, or both;
monitor the wireless channel for the first set of reference signals according to the first periodicity based at least in part on the updated configuration for reference signal measurements; and
monitor the wireless channel for the second set of reference signals according to the second periodicity based at least in part on the updated configuration for reference signal measurements.

7. The UE of claim 2, wherein the one or more processors are individually or collectively further operable to execute the code to cause the UE to:
receive the control message indicating to remove one or more beams from the first set of beams, remove one or more beams from the second set of beams, or both;
monitor the wireless channel for the first set of reference signals communicated via the first set of beams according to the updated configuration for reference signal measurements; and
monitor the wireless channel for the second set of reference signals communicated via the second set of beams according to the updated configuration for reference signal measurements.

8. The UE of claim 2, wherein the one or more processors are individually or collectively further operable to execute the code to cause the UE to:
receive the control message indicating to add one or more beams to the first set of beams, add one or more beams to the second set of beams, or both;
monitor the wireless channel for the first set of reference signals communicated via the first set of beams according to the updated configuration for reference signal measurements; and
monitor the wireless channel for the second set of reference signals communicated via the second set of beams according to the updated configuration for reference signal measurements.

9. The UE of claim 1, wherein the configuration for reference signal measurements configures the UE to monitor for the first set of reference signals and the second set of reference signals within a same time window.

10. The UE of claim 1, wherein monitoring for the first set of reference signals at least partially overlaps with monitoring for the second set of reference signals.

11. The UE of claim 1, wherein the first periodicity and the second periodicity each comprise a respective periodicity stored at the UE.

12. The UE of claim 1, wherein:
the configuration for reference signal measurements is indicative of one or more parameters for selecting a third set of beams and a third periodicity for measuring reference signals on the third set of beams; and
the third periodicity is different from the first periodicity and the second periodicity.

13. A network node, comprising:
one or more memories storing processor-executable code; and
one or more processors coupled with the one or more memories and individually or collectively operable to execute the code to cause the network node to:
transmit, to a user equipment (UE), an indication of a configuration for reference signal measurements, the configuration indicative of one or more parameters for selecting a first set of beams, a first periodicity for measuring reference signals on the first set of beams, a second set of beams, and a second periodicity for measuring reference signals on the second set of beams, wherein the second periodicity is different than the first periodicity;
transmit a first set of reference signals over a wireless channel via the first set of beams and according to the first periodicity; and
transmit a second set of reference signals over the wireless channel via the second set of beams and according to the second periodicity.

14. The network node of claim 13, wherein the one or more processors are individually or collectively further operable to execute the code to cause the network node to:
transmit a control message indicating an update to the configuration for reference signal measurements; and
transmit the first set of reference signals and the second set of reference signals over the wireless channel according to the updated configuration for reference signal measurements.

15. The network node of claim 14, wherein the one or more processors are individually or collectively further operable to execute the code to cause the network node to:
receive a measurement report from the UE based at least in part on transmitting the first set of reference signals and the second set of reference signals, wherein transmitting the control message indicating the update is based at least in part on receiving the measurement report.

16. The network node of claim 15, wherein the measurement report indicates a subset of beams having a highest communication quality across the first set of beams and the second set of beams, the subset of beams comprising a defined quantity of beams.

17. The network node of claim 14, wherein the one or more processors are individually or collectively further operable to execute the code to cause the network node to:
identify a change to make to the first set of beams, the second set of beams, or both using a machine learning algorithm, wherein transmitting the control message indicating the update to the configuration for reference signal measurements is based at least in part on identifying the change.

18. The network node of claim 14, wherein the one or more processors are individually or collectively further operable to execute the code to cause the network node to:
transmit the control message indicating to move one or more beams from the first set of beams to the second set of beams, move one or more beams from the second set of beams to the first set of beams, or any combination thereof;
transmit the first set of reference signals over the wireless channel via the first set of beams and according to the updated configuration for reference signal measurements; and
transmit the second set of reference signals over the wireless channel via the second set of beams and according to the updated configuration for reference signal measurements.

19. The network node of claim 14, wherein the one or more processors are individually or collectively further operable to execute the code to cause the network node to:
transmit the control message indicating an updated value for the first periodicity, an updated value for the second periodicity, or both;
transmit the first set of reference signals over the wireless channel according to the first periodicity based at least in part on the updated configuration for reference signal measurements; and
transmit the second set of reference signals over the wireless channel according to the second periodicity based at least in part on the updated configuration for reference signal measurements.

20. The network node of claim 14, wherein the one or more processors are individually or collectively further operable to execute the code to cause the network node to:
transmit the control message indicating to remove one or more beams from the first set of beams, remove one or more beams from the second set of beams, or both;
transmit the first set of reference signals over the wireless channel via the first set of beams and according to the updated configuration for reference signal measurements; and
transmit the second set of reference signals over the wireless channel via the second set of beams and according to the updated configuration for reference signal measurements.

21. The network node of claim 14, wherein the one or more processors are individually or collectively further operable to execute the code to cause the network node to:
transmit the control message indicating to add one or more beams to the first set of beams, add one or more beams to the second set of beams, or both;
transmit the first set of reference signals over the wireless channel via the first set of beams and according to the updated configuration for reference signal measurements; and
transmit the second set of reference signals over the wireless channel via the second set of beams and according to the updated configuration for reference signal measurements.

22. The network node of claim 13, wherein the configuration for reference signal measurements configures the UE to monitor for the first set of reference signals and the second set of reference signals within a same time window.

23. The network node of claim 13, wherein transmitting the first set of reference signals at least partially overlaps with transmitting the second set of reference signals.

24. The network node of claim 13, wherein the first periodicity and the second periodicity each comprise a respective periodicity stored at the network node.

25. A method for wireless communication at a user equipment (UE), comprising:
   receiving, from a network node, an indication of a configuration for reference signal measurements;
   selecting, based at least in part on the configuration, a first set of beams, a first periodicity for measuring reference signals on the first set of beams, a second set of beams, and a second periodicity for measuring reference signals on the second set of beams, wherein the second periodicity is different than the first periodicity;
   monitoring a wireless channel for a first set of reference signals communicated via the first set of beams according to the first periodicity; and
   monitoring the wireless channel for a second set of reference signals communicated via the second set of beams according to the second periodicity.

26. The method of claim 25, further comprising:
   receiving a control message indicating an update to the configuration for reference signal measurements; and
   monitoring the wireless channel for the first set of reference signals and the second set of reference signals according to the updated configuration for reference signal measurements.

27. The method of claim 26, further comprising:
   transmitting a measurement report to the network node based at least in part on monitoring for the first set of reference signals and monitoring for the second set of reference signals, wherein receiving the control message indicating the update is based at least in part on transmitting the measurement report.

28. A method for wireless communication at a network node, comprising:
   transmitting, to a user equipment (UE), an indication of a configuration for reference signal measurements, the configuration indicative of one or more parameters for selecting a first set of beams, a first periodicity for measuring reference signals on the first set of beams, a second set of beams, and a second periodicity for measuring reference signals on the second set of beams, wherein the second periodicity is different than the first periodicity;
   transmitting a first set of reference signals over a wireless channel via the first set of beams and according to the first periodicity; and
   transmitting a second set of reference signals over the wireless channel via the second set of beams and according to the second periodicity.

29. The method of claim 28, further comprising:
   transmitting a control message indicating an update to the configuration for reference signal measurements; and
   transmitting the first set of reference signals and the second set of reference signals over the wireless channel according to the updated configuration for reference signal measurements.

30. The method of claim 29, further comprising:
   receiving a measurement report from the UE based at least in part on transmitting the first set of reference signals and the second set of reference signals, wherein transmitting the control message indicating the update is based at least in part on receiving the measurement report.

* * * * *